US012726794B2

(12) United States Patent
Chen

(10) Patent No.: US 12,726,794 B2
(45) Date of Patent: Sep. 1, 2026

(54) BWP OPERATION FOR NR MULTICAST AND BROADCAST SERVICES

(71) Applicant: PURPLEVINE INNOVATION COMPANY LIMITED, Hong Kong (HK)

(72) Inventor: Chiu-Wen Chen, Hong Kong (HK)

(73) Assignee: PURPLEVINE INNOVATION COMPANY LIMITED, Hong Kong (CN)

( * ) Notice: Subject to any disclaimer, the term of this patent is extended or adjusted under 35 U.S.C. 154(b) by 231 days.

(21) Appl. No.: 18/552,578

(22) PCT Filed: Mar. 25, 2022

(86) PCT No.: PCT/CN2022/083184
§ 371 (c)(1),
(2) Date: Sep. 26, 2023

(87) PCT Pub. No.: WO2022/199702
PCT Pub. Date: Sep. 29, 2022

(65) Prior Publication Data

US 2024/0373296 A1 Nov. 7, 2024

Related U.S. Application Data

(60) Provisional application No. 63/166,268, filed on Mar. 26, 2021.

(51) Int. Cl.
*H04W 36/00* (2009.01)
*H04L 27/26* (2006.01)
(Continued)

(52) U.S. Cl.
CPC ......... *H04W 4/06* (2013.01); *H04L 27/26025* (2021.01); *H04W 36/0007* (2018.08);
(Continued)

(58) Field of Classification Search
CPC ................................................ H04W 36/0007
See application file for complete search history.

(56) References Cited

U.S. PATENT DOCUMENTS

2016/0249266 A1* 8/2016 Kim ........................ H04W 4/06
2021/0076445 A1* 3/2021 Tsai .................. H04W 74/0833
(Continued)

FOREIGN PATENT DOCUMENTS

CN 110249694 A 9/2019
CN 110971474 A 4/2020
(Continued)

OTHER PUBLICATIONS

International Search Report in International application No. PCT/CN2022/083184,mailed on Jun. 17, 2022.
(Continued)

*Primary Examiner* — Pamit Kaur
(74) *Attorney, Agent, or Firm* — PV IP PC; Wei Te Chung

(57) ABSTRACT

A group-common resource allocation method for multicast and broadcast service (MBS) and related devices are provided. The method includes when there is no data ongoing for MBS and unicast on an active BWP, switching from the active BWP to a default BWP upon expiry of a first MBS bwp-Inactivity Timer for MBS or a bwp-Inactivity Timer for unicast; and monitoring group-common resources on the default BWP for MBS reception. With this method, power consumption for MBS reception is improved.

18 Claims, 9 Drawing Sheets

(51) Int. Cl.
*H04W 4/06* (2009.01)
*H04W 72/0453* (2023.01)

(52) U.S. Cl.
CPC ... *H04W 36/0061* (2013.01); *H04W 36/0072* (2013.01); *H04W 72/0453* (2013.01)

(56) References Cited

U.S. PATENT DOCUMENTS

2022/0231818 A1* 7/2022 Lee ........................ H04L 5/0098
2022/0303892 A1* 9/2022 Awadin ................. H04W 72/23
2022/0407646 A1 12/2022 Yoshioka

FOREIGN PATENT DOCUMENTS

CN 111615859 A 9/2020
CN 112423237 A 2/2021
WO 2020255417 A1 12/2020
WO 2021051319 A1 3/2021
WO 2021051348 A1 3/2021

OTHER PUBLICATIONS

Written Opinion of the International Search Authority in International application No. PCT/CN2022/083184,mailed on Jun. 17, 2022.
Interdigital, Inc. “Details of BWP switching operation” 3GPP TSG RAN WG1 Meeting AH1801 R1-1800603, Jan. 26, 2018 (Jan. 26, 2018), the whole document.
Chinese Office Action issued in corresponding Chinese Patent Application No. 202280012390.7 dated Jun. 11, 2026, pp. 1-10.
NPL1: R1-2008882, 2020-11-02.
NPL2: R1-2009305, 2020-11-02.
NPL3: vivo, R2-2102249 ’Summary for MBS Group Scheduling under Agenda Item 8.1.2.4, Jan. 25, 2021.
NPL4: “draft r1-200xxxx summary#1 on group scheduling for nr mbs_v036_lenovo_vivo”, Jan. 27, 2021.

* cited by examiner

100

110 — being allocated a unicast BWP with one or more group-common resources for MBS by a base station 120 — staying on a same active unicast bandwidth part (BWP) for monitoring the one or more group-common resources for MBS reception without any BWP switching, wherein the one or more group-common resources for MBS are confined with resources of the active unicast BWP

BWP OPERATION FOR NR MULTICAST AND BROADCAST SERVICES

TECHNICAL FIELD

The present disclosure relates to the field of wireless communications, and more particularly, to a group-common resource allocation method and a bandwidth part (BWP) switching method for multicast and broadcast service (MBS) and related devices.

BACKGROUND ART

Communication systems and networks have developed towards being a broadband and mobile system. In cellular wireless communication systems developed by the Third Generation Partnership Project (3GPP), user equipment (UE) is connected by a wireless link to a radio access network (RAN). The RAN includes a set of base stations (BSs) which provide wireless links to the UEs located in cells covered by the base station, and an interface to a core network (CN) which provides overall network control. As will be appreciated the RAN and CN each conduct respective functions in relation to the overall network. The 3GPP has developed the so-called Long Term Evolution (LTE) system, namely, an Evolved Universal Mobile Telecommunication System Territorial Radio Access Network (E-UTRAN), for a mobile access network where one or more macro-cells are supported by a base station known as an eNodeB or eNB (evolved NodeB). More recently, evolved from LTE, the so-called 5G or New radio (NR) systems where one or more cells are supported by a base station known as a gNB.

In LTE, the network may order the UE to get into an RRC_IDLE state if the UE has no activity for a while. This is done to reduce UE's power consumption. The UE needs to transit from the RRC_IDLE state to an RRC_CONNECTED state whenever the UE needs to perform some activity. Since small amounts of data have to be sent very frequently in current mobile communication applications, frequent Idle-Connected-Idle transitions increase network signaling load and latency. Therefore, 5G NR has defined a new state called RRC_INACTIVE to reduce network signaling load and latency involved in transiting to RRC_CONNECTED state. In NR, a UE is in RRC_CONNECTED when an RRC connection has been established or in RRC_INACTIVE when the RRC connection is suspended. If this is not the case, the UE is in RRC_IDLE state, that is, no RRC connection is established. More specifically, in RRC_INACTIVE state, the UE Access Stratum (AS) context is stored at both UE and network sides so that the core network connection is maintained (i.e., the UE keeps in CM (abbreviated from Connection Management)-CONNECTED) and the radio access network (RAN) connection is released. The network can reach the inactive UE through RAN or CN Paging messages.

Broadcast/multicast service is not yet specified in the first two new radio (NR) releases, i.e., Rel-15 and Rel-16. Nevertheless, there are important use cases (e.g., public safety and mission critical, V2X applications, transparent IPv4/IPv6 multicast delivery, IPTV, software delivery over wireless, group communications and IoT applications, but not limited to.) for which broadcast/multicast could provide substantial improvements, especially regards to system efficiency and user experience. In 5G NR multicast and broadcast service (NR MBS), Single-Cell Point-to-Multipoint (SC-PTM) defined in LTE is the baseline. In NR, it supports the reception of NR MBS by the mobile UEs in RRC_CONNECTED/RRC_INACTIVE/RRC_IDLE states.

The architecture of 5G new radio multicast and broadcast service (NR MBS) is expected to be similar as SC-PTM defined in LTE. And Multicast-broadcast single-frequency network (MBSFN) described in LTE is not expected to be supported in NR MBS. However, it is not practical for the UE to receive the NR MBS on the bandwidth of the whole component carrier (e.g., 400 MHz) since the UE may be required to increase the power consumption and the manufacturing cost. With bandwidth parts (BWP), the carrier can be subdivided and used for spectrum and power efficiency. Currently, there is no correspondence between BWP and NR MBS. To configure the UEs for active BWP switching of NR MBS, a group scheduling mechanism should be introduced.

SUMMARY

An object of the present disclosure is to propose a group-common resource allocation method and a BWP switching method for MBS and related devices for specifying necessary enhancements that are required to enable simultaneous MBS operation with unicast reception, which can solve issues in the prior art, improve reliability of MBS transmission, minimize BWP switching time, improve resource efficiency, improve power consumption and signaling overhead, and/or provide a good communication performance.

In a first aspect of the present disclosure, provided is a group-common resource allocation method for multicast and broadcast service (MBS), performed by a user equipment (UE) in a network, the method comprising: being allocated a unicast BWP with one or more group-common resources for MBS by a base station; and staying on a same active unicast bandwidth part (BWP) for monitoring the one or more group-common resources for MBS reception without any BWP switching, wherein the one or more group-common resources for MBS are confined with resources of the active unicast BWP.

In a second aspect of the present disclosure, provided is a group-common resource allocation method for multicast and broadcast service (MBS), performed by a base station (BS) in a network, the method comprising: allocating for a user equipment (UE) a unicast BWP with one or more group-common resources for MBS; and configuring the unicast BWP for the UE to stay on a same active unicast bandwidth part (BWP) for monitoring the one or more group-common resources for MBS reception without any BWP switching, wherein the one or more group-common resources for MBS are confined with resources of the active unicast BWP.

In a third aspect of the present disclosure, provided is a bandwidth part (BWP) switching method for multicast and broadcast service (MBS), performed by a user equipment (UE) in a network, the method comprising: determining whether an MBS is interesting; if the UE interests in receiving the MBS and an MBS BWP switching indication is received from a base station, switching to an indicated BWP by the MBS BWP switching indication; and monitoring one or more group-common resources for MBS on the indicated BWP, wherein the one or more group-common resources for MBS are confined with resources of associated unicast BWP.

In a fourth aspect of the present disclosure, provided is a bandwidth part (BWP) switching method for multicast and broadcast service (MBS), performed by a base station (BS) in a network, the method comprising: determining whether an MBS is interesting by a user equipment (UE); if the UE interests in receiving the MBS, transmitting an MBS BWP switching indication to the UE for the UE to switch to an indicated BWP by the MBS BWP switching indication; and expecting the UE to monitor one or more group-common resources for MBS on the indicated BWP, wherein the one or more group-common resources for MBS are confined with resources of associated unicast BWP.

In a fifth aspect of the present disclosure, provided is a bandwidth part (BWP) switching method for multicast and broadcast service (MBS), performed by a user equipment (UE) in a network, the method comprising: when there is no data ongoing for MBS and unicast on an active BWP, switching from the active BWP to a default BWP upon expiry of a first MBS bwp-Inactivity Timer for MBS or a bwp-Inactivity Timer for unicast; and monitoring group-common resources on the default BWP for MBS reception.

In a sixth aspect of the present disclosure, provided is a bandwidth part (BWP) switching method for multicast and broadcast service (MBS), performed by a base station (BS) in a network, the method comprising: configuring a user equipment (UE) with a first MBS bwp-Inactivity Timer for MBS or a bwp-Inactivity Timer for unicast for the UE to switch, when there is no data ongoing for MBS and unicast on an active BWP, from the active BWP to a default BWP upon expiry of the first MBS bwp-Inactivity Timer or the bwp-Inactivity Timer for unicast; and expecting the UE to monitor group-common resources on the default BWP for MBS reception.

In a seventh aspect of the present disclosure, a user equipment includes a memory, a transceiver and a processor coupled to the memory and the transceiver, the processor configured to call and run program instructions stored in a memory, to execute the above method.

In an eighth aspect of the present disclosure, a base station includes a memory, a transceiver and a processor coupled to the memory and the transceiver, the processor configured to call and run program instructions stored in a memory, to execute the above method.

In a ninth aspect of the present disclosure, a non-transitory machine-readable storage medium has stored thereon instructions that, when executed by a computer, cause the computer to perform the above method.

In a tenth aspect of the present disclosure, a chip includes a processor, configured to call and run a computer program stored in a memory, to cause a device in which the chip is installed to execute the above method.

In an eleventh aspect of the present disclosure, a computer readable storage medium, in which a computer program is stored, causes a computer to execute the above method.

In a twelfth aspect of the present disclosure, a computer program product includes a computer program, and the computer program causes a computer to execute the above method.

In a thirteenth aspect of the present disclosure, a computer program causes a computer to execute the above method.

DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

FIG. 1(*b*) is a block diagram of a user equipment and a base station of wireless communication in a communication controlling system according to an embodiment of the present disclosure.

FIG. 5(*b*) is a schematic diagram illustrating group-common resource for MBS supporting TDM within associated unicast BWP.

FIG. 5(*c*) is a schematic diagram illustrating group-common resource for MBS supporting FDM/TDM within associated unicast BWP.

DETAILED DESCRIPTION OF EMBODIMENTS

Embodiments of the disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

In this document, the term "/" should be interpreted to indicate "and/or."

The objective of this invention includes specifying necessary enhancements that are required to enable simultaneous MBS operation with unicast reception. Furthermore, with UE mobility consideration, an MBS data loss and un-reliable MBS data transmission are resolved. Also, an MBS BWP switching method is proposed in this invention. For MBS data transmission reliability, MBS BWP switching is indicated for RRC_CONNECTED/RRC_INACTIVE/RRC_IDLE UEs. And some MBS-assistance information is proposed for MBS request with/without MBS BWP switching. This can be used to improve reliability of MBS data transmission and achieve service continuity during BWP switching and mobility.

Figure 1A:
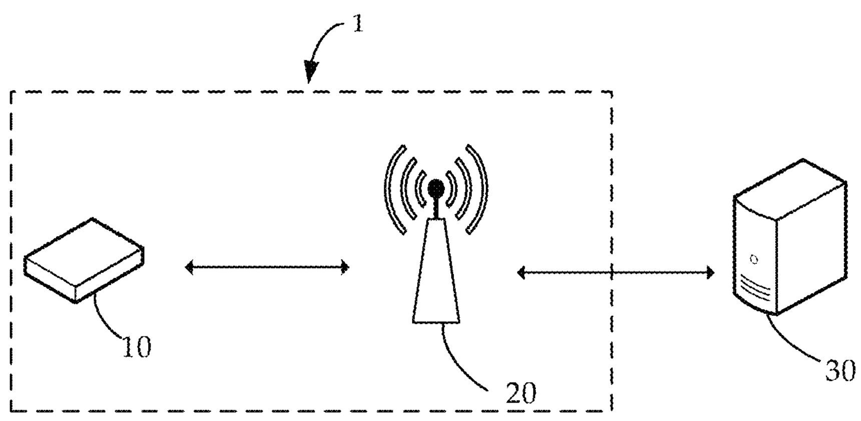
FIG. 1(*a*) is a schematic diagram illustrating a communication controlling system according to an embodiment of the present disclosure.
Figure 1B:
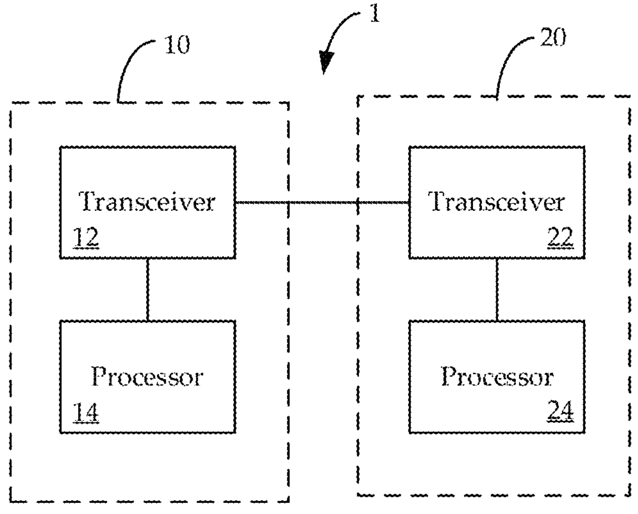

A schematic view and a functional block diagram of a communication controlling system 1 according to the present invention are shown in FIG. 1(*a*) and FIG. 1(*b*) respectively. The communication controlling system 1 includes a user equipment 10 and a base station 20. The user equipment 10 and the base station 20 may communicate with each other either wirelessly or in a wired way. The base station 20 and a next generation core network 30 may also communicate with each other either wirelessly or in a wired way. When the communication controlling system 1 complies with the New Radio (NR) standard of the 3rd Generation Partnership Project (3GPP), the next generation core network (5GCN) 30 is a backend serving network system and may include an Access and Mobility Management Function (AMF), User Plane Function (UPF), and a Session Management Function (SMF).

The user equipment 10 may be a non-NPN capable apparatus or a non-public network (NPN) capable apparatus, but the present invention is not limited to this. The user equipment 10 includes a transceiver 12 and a processor 14, which are electrically connected with each other. The base station 20 includes a transceiver 22 and a processor 24, which are electrically connected with each other. The transceiver 12 of the user equipment 10 is configured to transmit a signal to the base station 20 and the processor 24 of the base station 20 processes the signal, the transceiver 22 of the base station 20 is configured to transmit a signal to the user equipment 10 and the processor 14 of the user equipment 10 processes the signal. In this way, the user equipment 10 communicates with the base station 20 each other.

Figure 2:
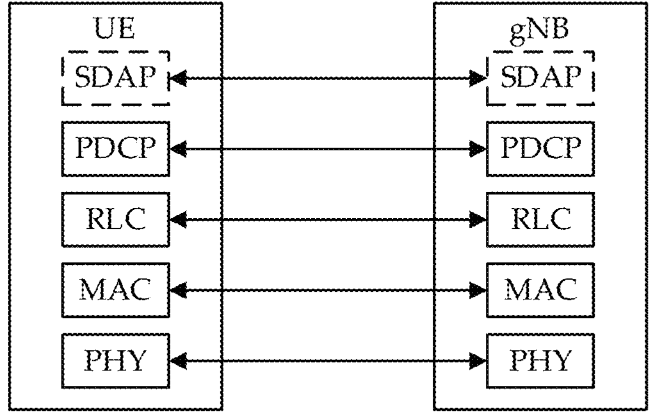
FIG. 2 is a schematic diagram illustrating a user plane radio protocol architecture within gNB and UE for MBS.

In 5G, point to multipoint transmission in a cell (i.e., single cell-point to multipoint, SC-PTM) is supported for new radio multicast and broadcast service (NR MBS). The user plane radio protocol architecture within the gNB and UE for NR MBS is shown in FIG. 2, which includes optional Service Data Adaptation Protocol (SDAP), Packet Data Convergence Protocol (PDCP), Radio Link Control (RLC), Medium Access Control (MAC). In NR, if an MBS session can be mapped to multiple MBS QoS flows, there can be two options regarding the NR MBS QOS flows are mapped to NR MBS radio bearers: 1) reuse NR SDAP to handle MBS bearer mapping; 2) depend on the network implementation without NR SDAP stack.

Figures 3, 4:
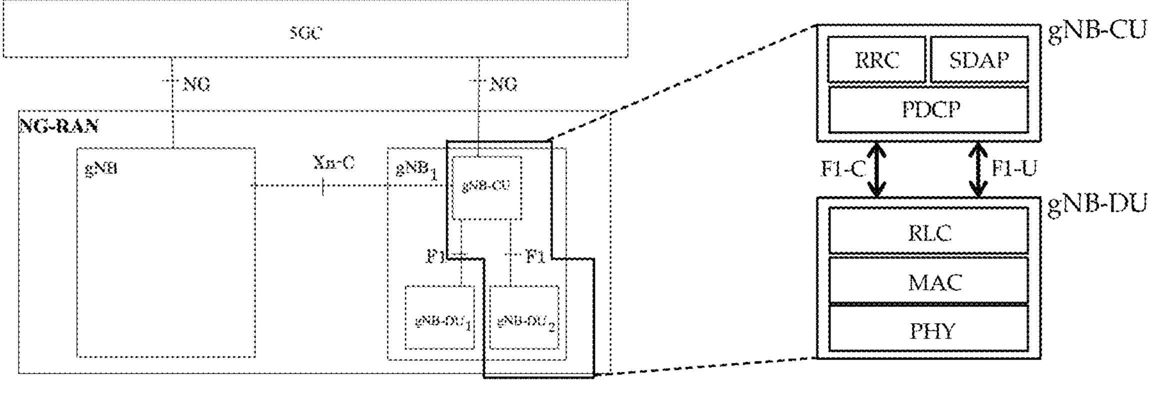
FIG. 3 is a schematic diagram illustrating a gNB further including a centralized unit (CU) and a plurality of distributed unit (DUs).
FIG. 4 is a flowchart of a group-common resource allocation method according to an embodiment of the present disclosure.

In RAN functional split, the gNB further includes a centralized unit (CU) and a plurality of distributed unit (DUs) as shown in FIG. 3. The protocol stack of CU includes an RRC layer, an optional SDAP layer, and a PDCP layer, while the protocol stack of DU includes an RLC layer, a MAC layer, and a PHY layer. The F1 interface between the CU and DU is established between the PDCP layer of the protocol stack and the RLC layer of the protocol stack.

The bandwidth of 5G NR system is divided into a plurality of component carriers (CCs). But it is not practical for the UE to perform on the wide bandwidth of the CC (e.g., 400 MHz) since the UE may be required to have a higher bandwidth capability and power consumption of the UE. Each CC may be further divided into a plurality of bandwidth parts (BWPs) to reduce the manufacturing cost of the UE. For example, each serving cell can configure the UE with one or multiple BWPs, and the maximum number of BWP per serving cell is four BWPs for a given UE, and only one BWP (but not limit to) can be activated at a given time according to current 3GPP specification. There may be more than one BWP to be activated at a given time in future developments.

FIG. 4 illustrates a group-common resource allocation method 100 for multicast and broadcast service (MBS) according to an aspect of the present disclosure. The method 100 is performed by a user equipment (UE) in a network. The method 100 may include the following steps. In Block 110, the UE is allocated a unicast bandwidth part (BWP) with one or more group-common resources for MBS by a base station. In Block 120, the UE stays on a same active unicast BWP for monitoring the one or more group-common resources for MBS reception without any BWP switching, wherein the one or more group-common resources for MBS are confined with resources of the active unicast BWP. This can solve issues in the prior art, improve reliability of MBS transmission, improve resource efficiency, improve power consumption and signaling overhead, and/or provide a good communication performance.

When NR system supports the BWP operation for MBS, the following types of MBS specific BWP (i.e., initial MBS BWP, default MBS BWP and active MBS BWP) associated with/within UE unicast BWP and group-common resource may be defined as follows:

(a) Initial MBS BWP

Initial DL MBS BWP is used to transmit MBS related system information, MBS paging, MBS BWP switching indication, MBS configuration (e.g., MBS session identifier, transmission frequency/BWP and period) via Broadcast Control Channel (BCCH) and/or Multicast control channel (MCCH) and MBS data transmission/reception via Multicast Traffic Channel (MTCH) for RRC_IDLE/RRC_INACTIVE/RRC_CONNECTED UEs. A notification signaling (e.g., systemInfoModification in SIB2, MBSConfigModification in RRC signaling) is used to announce the change of MBS configuration. For example, there is at least one bit in the notification signaling to indicate the MCCH change due the MBS session start/stop, or the neighboring MBS cell list update.

Initial UL MBS BWP is used to transmit on-demand MBS system information request, interest indication, counting signaling, MBS HARQ ACK/NACK feedback, MBS scheduling request, proximity indication, MBS measurement report, etc. via Common Control Channel (CCCH)/Dedicated Control Channel (DCCH)/Dedicated Traffic Channel (DTCH)/MCCH/MTCH for RRC_IDLE/RRC_INACTIVE/RRC_CONNECTED UEs.

The initial DL/UL MBS BWP should be overlapped with even same as the initial BWP (at least overlapped with SS/PBCH Block (i.e., SSB) so that the RRC_IDLE/RRC_INACTIVE/RRC_CONNECTED UEs can receive system information, NR MBS configuration, paging, NR MBS data, etc. without any MBS BWP switching. At least one DL group-common resource(s) for MBS PDCCH/PDSCH monitoring and optional UL group-common resource(s) for MBS PUCCH/PUSCH transmission are allocated in initial DL MBS BWP and initial UL MBS BWP respectively. The group-common PDCCH/PDSCH resource for NR MBS is an MBS specific region with a number of contiguous physical resource blocks (PRBs). At least the minimum system information (i.e., MIB, SIB1) and system information for NR MBS should be transmitted on the initial DL MBS BWP.

(b) Default MBS BWP

Default DL MBS BWP is used to transmit MBS related system information, MBS paging, MBS BWP switching indication, MBS configuration (e.g., MBS session identifier, transmission frequency/BWP and period) via BCCH and/or MCCH and MBS data transmission/reception via MTCH for RRC_IDLE/RRC_INACTIVE/RRC_CONNECTED UEs. A notification signaling (e.g., systemInfoModification in SIB2, MBSConfigModification in RRC signaling) is used to announce the change of MBS configuration. For example, there is at least one bit in the notification signaling to indicate the MCCH change due the MBS session start/stop, or the neighboring MBS cell list update.

Default UL MBS BWP is used to transmit on-demand MBS system information request, interest indication, counting signaling, MBS HARQ ACK/NACK feedback, MBS scheduling request, proximity indication, MBS measurement report, etc. via CCCH/DCCH/DTCH/MCCH/MTCH for RRC_IDLE/RRC_INACTIVE/RRC_CONNECTED UEs.

The default DL/UL MBS BWP can be a UE-specific BWP and configured via RRC reconfiguration. The configured default MBS BWP is associated with the active unicast BWP of UE(s) and used the same numerology (i.e., subcarrier spacing, cyclic prefix) with the associated active unicast BWP. Each RRC_IDLE/RRC_INACTIVE/RRC_CONNECTED MBS UE would switch back to the default MBS BWP upon MBSbwp-InactivityTimer expiry. The network can configure different UE with different default MBS BWP according to the associated MBS QOS requirement (e.g., NR 5QI, NR MBS delivery mode 1 or mode 2, etc.). If the default MBS BWP is not configured, the initial MBS BWP would be the default MBS BWP.

The default MBS BWP may or may not be overlapped with even same as the initial BWP so that the RRC_IDLE/RRC_INACTIVE/RRC_CONNECTED UEs can receive at least NR MBS related system information, NR MBS configuration, NR MBS paging, NR MBS data, etc. without any MBS BWP switching. Note that NR MBS related system information may be transmitted in the existing system information (e.g., SIB1, SIB2, etc.) or in a new system information block or in a new pre-configured on-demand system information requested by UE(s). NR MBS paging is used to inform RRC_IDLE/RRC_INACTIVE MBS UE(s) about special events (e.g., emergency service, other data transfer, etc.). In some cases, some paging information (e.g., MBS session identifier, Temporary Mobile Group Identifier, access type) should be transmitted to the upper layer (e.g., NAS layer) upon the reception of NR MBS paging. For RRC_INACTIVE UE(s), the network can transmit NR MBS paging via RAN paging triggered by RAN Notification area and/or via CN paging triggered by Paging Group area. NR MBS paging can be transmitted through PCH or MCCH. At least one DL group-common resource(s) for MBS PDCCH/PDSCH monitoring and optional UL group-common resource(s) for MBS PUCCH/PUSCH transmission are allocated in default DL MBS BWP and default UL MBS BWP respectively. The group-common PDCCH/PDSCH resource for NR MBS is an MBS specific region with a number of contiguous physical resource blocks (PRBs).

(c) Active MBS BWP

Active DL MBS BWP is used to transmit on-demand MBS related system information, MBS paging, MBS BWP switching indication, update MBS configuration (e.g., MBS session identifier, transmission frequency/BWP and period) via DCCH and/or MCCH and MBS data transmission/reception via MTCH for RRC_CONNECTED UEs. A notification signaling (e.g., systemInfoModification in SIB2, MBSConfigModification in RRC signaling) is used to announce the update of MBS configuration. For example, there is at least one bit in the notification signaling to indicate the MCCH change due the MBS session start/stop, or the neighboring MBS cell list update.

The active UL MBS BWP can be used to transmit on-demand MBS system information request, interest indication, counting signaling, MBS HARQ ACK/NACK feedback, MBS scheduling request, proximity indication, MBS measurement report, etc. via CCCH/DCCH/DTCH/MCCH/MTCH for RRC_CONNECTED UEs.

The active DL/UL MBS BWP can be a UE-specific BWP and configured via RRC reconfiguration. The configured active MBS BWP is associated with the active unicast BWP of UE(s) (i.e., the active MBS BWP for group-common PDCCH/PDSCH resource is confined with the resource of active unicast BWP to support simultaneous reception of unicast and multicast in the same slot).

The active DL/UL MBS BWP can be activated by some switching indications (e.g., controlled by the group-common PDCCH resource for NR MBS, MBSbwp-InactivityTimer, RRC signaling, UL/DL MBS BWP association, MBS timer). The network can configure and switch different UE to different active MBS BWP for load balancing.

When there is only one active unicast BWP for a given UE, the active unicast BWP is also the active MBS BWP. Therefore, when the RRC_CONNECTED UE interests in receiving MBS but stays on the active unicast BWP which is not the MBS specific BWP, one simple way is to perform BWP switching to the MBS specific BWP. The other way is that the RRC_CONNECTED UE can transmit the on-demand MBS system information request to the UL active unicast BWP and receive the MBS related system information via unicast manner on the associated DL active BWP. The following MBS configuration/MBS data can be received on the same DL active BWP via point-to-point (PTP) mode without any MBS BWP switching. At this time, the UL/DL active unicast BWP would be acted as the UL/DL active MBS BWP. It enables simultaneous operation between NR MBS and unicast reception on the same DL BWP. In other words, the UL active MBS BWP and DL active MBS BWP may have a relation in association with pre-configured BWP identifiers.

In some other cases, there are more than one active BWP can be activated from UE perspective. The UE has higher RF capability (e.g., more than two RF chains) so that NR MBS and unicast reception can be performed on different DL BWPs if necessary.

- The RRC_CONNECTED MBS UE would switch from active MBS BWP to the default MBS BWP when it does not receive any data in a period (e.g., upon MBSbwp-Inactivity Timer expiry).
- On each active MBS BWP, at least one DL group-common resource(s) for MBS PDCCH/PDSCH monitoring and optional UL group-common resource(s) for MBS PUCCH/PUSCH transmission are allocated in active DL MBS BWP and active UL MBS BWP respectively. The group-common PDCCH/PDSCH resource for NR MBS is an MBS specific region with a number of contiguous physical resource blocks (PRBs). There is an initial active MBS BWP for a given UE after NR MBS subscription is completed. The initial active MBS BWP is the default MBS BWP, unless explicitly configured by RRC reconfiguration.

Figure 5A:
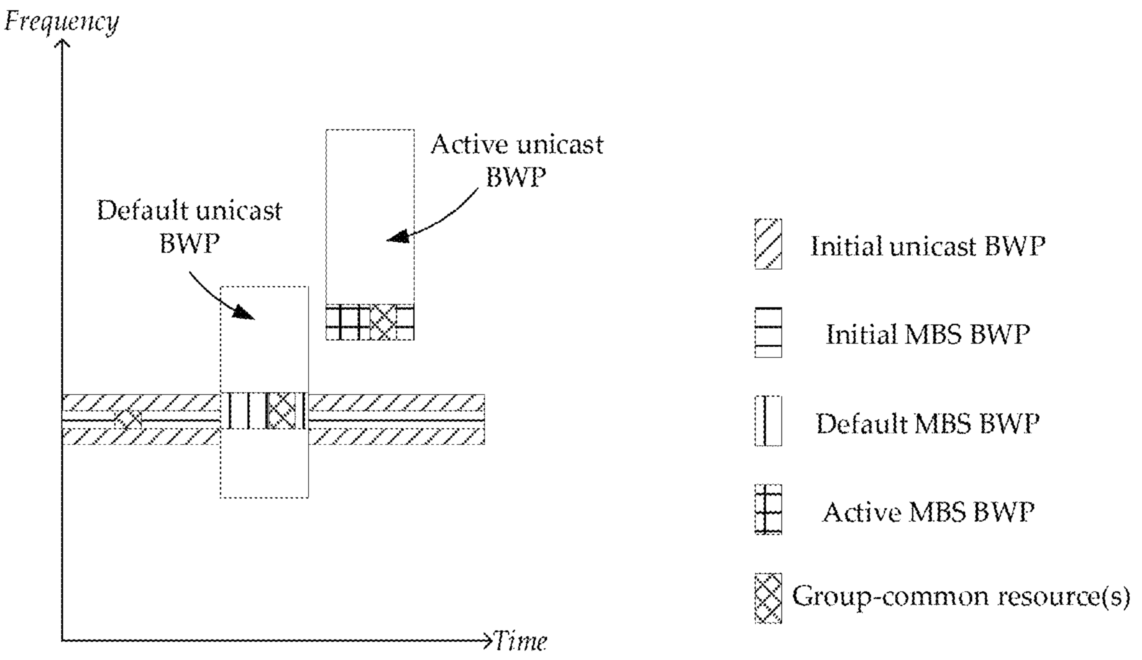
FIG. 5(*a*) is a schematic diagram illustrating group-common resource for MBS supporting FDM within associated unicast BWP.
Figure 5B:
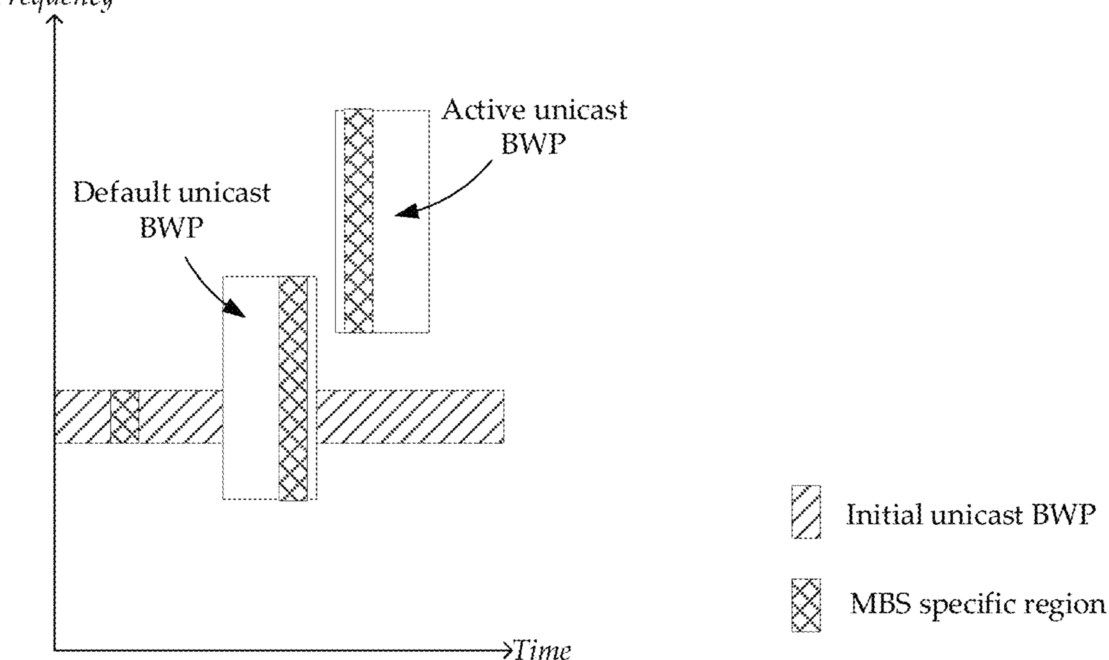
Figure 5C:
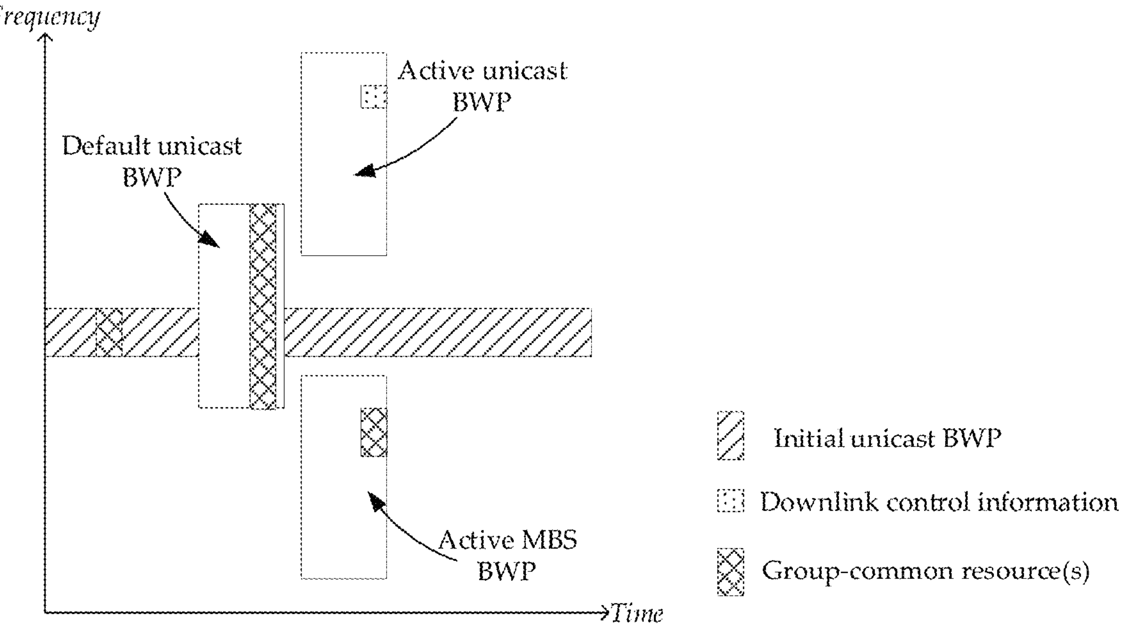

Furthermore, for PTM transmission of multiple MBS sessions within a MBS serving cell, one or multiple group-common resources can be applied for multiple MBS services. Each group-common resource is associated with MBS configuration. A group-common resource(s) for NR MBS transmission is allocated on the associated MBS BWP to the MBS-enabled UE(s) within at least one MBS session as shown in FIG. 5. The DL group-common resource(s) transmitted in PDCCH/PDSCH is used to transmit NR MBS related system information, NR MBS configuration, NR MBS paging, NR MBS switching indication, NR MBS data, etc. The UL group-common resource(s) transmitted in PUCCH/PUSCH is used to transmit on-demand MBS system information request, interest indication, counting signaling, MBS HARQ ACK/NACK feedback, MBS scheduling request, proximity indication, MBS measurement report, etc. The MBS BWP switching indication is used to indicate at least one UE (i.e., the MBS-enabled UEs within the serving cell) to perform BWP switching and is used to activate an inactive MBS BWP at a time for NR MBS data reception reliably, even in mobility scenarios. The MBS BWP switching is controlled by the group-common control resource for NR MBS, MBSbwp-InactivityTimer, RRC signaling, UL/DL MBS BWP association, MBS timer, and so on, but not limited to. The MBS BWP switching should consider with UE's unicast BWP switching based on the UE's service requirement (e.g., focus on MBS reception and/or unicast reception).

In FIG. 5(*a*), the initial/default/active MBS BWP for group-common resource is confined with the resource of associated unicast BWP to support simultaneous reception of unicast and multicast using the same numerology in the same slot. The operations of the MBS BWPs are defined as above. In this case, the MBS BWPs may overlap or support frequency division multiplexing (FDM) within the associated unicast BWP. There is a common frequency for the MBS-enabled UEs providing group-common resource transmission/reception. The NR MBS data can be operated with unicast data simultaneously on UE unicast BWP via FDMed manner.

In some embodiments, the group-common resource for NR MBS is an MBS specific region with a number of contiguous PRBs on UE unicast BWP (i.e., initial BWP, default BWP, active BWP). The group-common resource for NR MBS supports time division multiplexing (TDM) within the associated unicast BWP as shown in FIG. 5(*b*). In this case, the NR MBS data can be operated with unicast data simultaneously on UE unicast BWP via TDMed manner.

In further embodiments, the group-common resource(s) is configured in the associated BWP except for active unicast BWP. If a UE(s) interests in receiving MBS but stays on the active unicast BWP which is not the MBS specific BWP, a new downlink control information (DCI) format with CRC scrambled by C-RNTI within the unicast BWP can be used to indicate BWP switching to the MBS specific BWP for PTM mode MBS reception. On the other hand, if there is ongoing unicast data on the active unicast BWP, the UE should stay on the same active unicast BWP for NR MBS reception via PTP mode without any BWP switching. In this case, the NR MBS data and unicast data are transmitted/received (asynchronously) on different BWPs via FDMed manner while the NR MBS configuration can be configured within UE unicast BWP via TDMed manner as shown in FIG. 5(*c*), but not limited to. Note that, if the network and the MBS-enabled UE support more than one BWP to be activated at a given time, the NR MBS data can be operated with unicast data simultaneously on different BWPs.

For NR MBS in BWP operation, the BWP configuration (e.g., DLCarrierConfig, ULCarrierConfig) should be configurated to MBS-enabled UEs. When the group-common resource for NR MBS is configured within a BWP, the required group scheduling information is contained in a new downlink control information (DCI) format with CRC scrambled by Group-RNTI (G-RNTI) or Cell-RNTI (C-RNTI) or Inactive-RNTI (I-RNTI) or Paging-RNTI (P-RNTI).

The group-common control information transmitted by means of the new DCI format(s) for NR MBS may include but not limited to the following:

- MBS BWP resource allocation information (e.g., the starting PRB's point of MBS specific region, the number of PRBs of the MBS specific region, MBS BWP switching indication, MBS BWP switching timing offset, etc.)
- MBS HARQ information (e.g., the MBS HARQ process number, MBS HARQ ACK/NACK feedback indicator, MBS HARQ BWP switching indication, etc.)
- MBS-assistance resource allocation information (e.g., the allocation of UL group-common resource(s) for MBS interest/counting signaling, MBS scheduling request, proximity indication, MBS measurement report transmission, interest MBS BWP switching indication)

The new DCI format(s) under group-common PDCCH is used for scheduling UL/DL group-common PUSCH/PDSCH resource allocation to RRC_CONNECTED/RRC_INACTIVE/RRC_IDLE UE(s). The MBS control resource set (i.e., MBS CORESET) is a set of DL group-common control resources within an MBS/unicast specific BWP and used to carry the new DCI. In other words, the MBS CORESET, that is, a common frequency/time resource needs to be received by the MBS UEs. G-RNTI is used for point-to-multipoint (PTM) MBS delivery, while C-RNTI is used for point-to-point (PTP) MBS delivery and P-RNTI is used for either PTM or PTP MBS delivery. It is possible that both PTM and PTP delivery for one MBS session is configured to one UE simultaneously. The MBS serving cell, providing NR MBS towards the UEs within the initial/default/active MBS BWP, can decide to transmit MBS data via multicast radio bearer (e.g., MRB) and/or unicast data radio bearer (e.g., specific DRB) based on MBS reliability and QoS requirement. NR MBS using PTM transmission mode is delivered by MRB for the given UEs as well the group-common PDCCH scheduled PTM PDSCH data is scrambled by a specific G-RNTI. The NR MBS using PTP transmissions is delivered by the specific DRB with the scrambled C-RNTI for a given UE as well the PDCCH scheduled PTP PDSCH data is scrambled by a specific C-RNTI. For RRC_INACTIVE/RRC_IDLE UE(s), the NR MBS using PTM/PTP transmission mode is delivered by MRB/DRB for the given UE(s) as well the group-common PDCCH scheduled PTM/PTP PDSCH data is scrambled by G-RNTI or I-RNTI or P-RNTI.

If the RRC_CONNECTED/RRC_INACTIVE/RRC_IDLE UE detects the new DCI format with MBS BWP resource allocation information (e.g., MBS BWP switching indication) that indicates a DL active MBS BWP change for the NR MBS, the UE switches the DL BWP (i.e., a DL active BWP or a DL non-active BWP) to the DL active MBS BWP indicated by the MBS BWP switching indication.

If the RRC_CONNECTED detects the new DCI format with MBS HARQ information (e.g., MBS HARQ BWP switching indication) that indicates a UL active MBS BWP change for the NR MBS HARQ ACK/NACK feedback, the UE switches the UL active BWP to the BWP indicated by MBS HARQ BWP switching indication. In some cases, if the MBS HARQ BWP switching indication is not explicitly indicated in DCI, the RRC_CONNECTED UE can receive the MBS data on the DL active MBS BWP and transmit the MBS HARQ ACK/NACK feedback on the associated UL active MBS BWP without any MBS BWP switching. In other words, the DL active MBS BWP and UL active MBS BWP may have a relation in association with the pre-configured BWP identifiers.

If the RRC_CONNECTED/RRC_INACTIVE/RRC_IDLE UE detects the new DCI format with MBS-assistance resource allocation information (e.g., interest MBS BWP switching indication) that indicates a UL active BWP change for the MBS-assistance information transmission, the RRC_IDLE/RRC_INACTIVE/RRC_CONNECTED UE switches the UL BWP to the BWP indicated by interest MBS BWP switching indication.

In general, the UE can transmit MBS-assistance information (e.g., MBS interest/counting signaling, MBS scheduling request, proximity indication) via RRC/PHY layer signaling on the scheduled group-common or dedicated resource of indicated BWP. Upon the reception of MBS assistance information, the gNB can decide to transmit NR MBS via PTM or PTP transmission mode based on MBS QOS requirement. Considering the BWP operation, if the interest MBS BWP switching indication is explicitly indicated in DCI, when the UE has interests for NR MBS, it would transmit NR MBS interest/counting/MBS scheduling request/proximity indication signaling on the indicated BWP and receive the MBS data on the associated DL MBS BWP. In other cases, if the interest MBS BWP switching indication is not explicitly indicated in DCI, the UE would transmit MBS-assistance information on the ongoing UL BWP and receive the MBS data on the associated DL MBS BWP without any MBS BWP switching. In other words, the UL BWP transmitted MBS-assistance information, and DL MBS BWP may have a relation in association with the pre-configured BWP identifiers.

Figure 6:
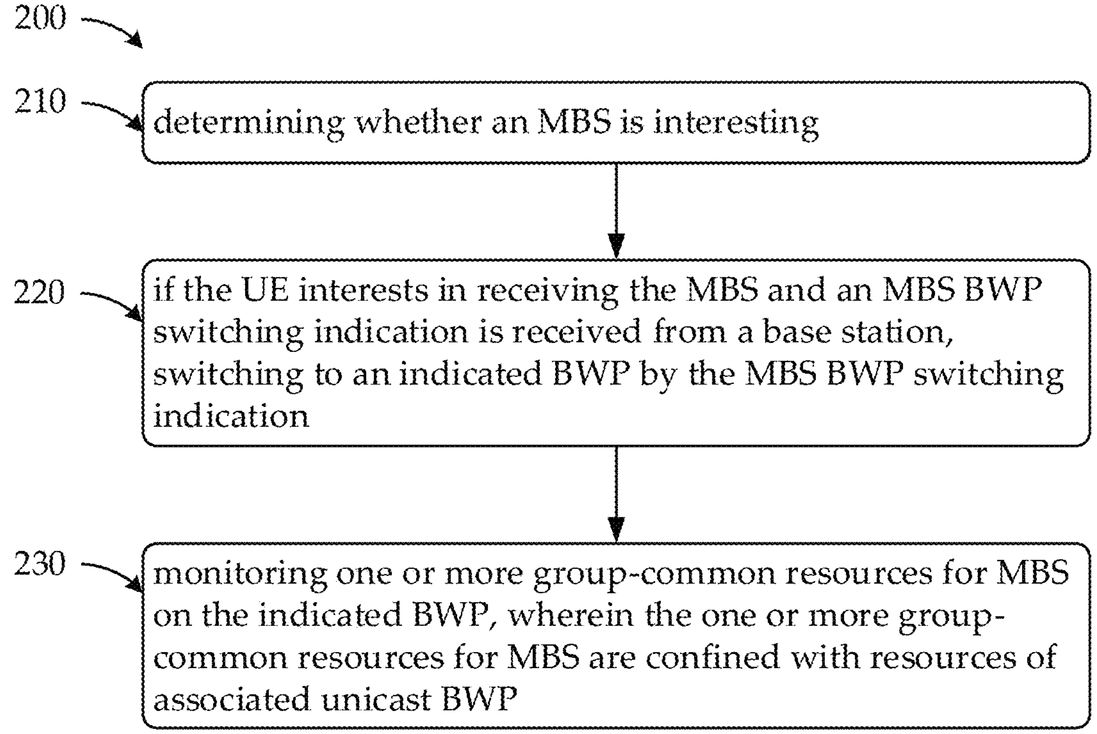
FIG. 6 is a flowchart of a BWP switching method according to a first aspect of the present disclosure.

FIG. 6 illustrates a BWP switching method 200 for multicast and broadcast service (MBS) according to an aspect of the present disclosure. The method 200 is performed by a user equipment (UE) in a network. The method 200 may include the following steps. In Block 210, the UE determines whether an MBS is interesting. In Block 220, if the UE interests in receiving the MBS and an MBS BWP switching indication is received from a base station, the UE switches to an indicated BWP by the MBS BWP switching indication. In Block 230, the UE monitors one or more group-common resources for MBS on the indicated BWP, wherein the one or more group-common resources for MBS are confined with resources of associated unicast BWP. This can solve issues in the prior art, improve reliability of MBS transmission, minimize BWP switching time, improve resource efficiency, improve power consumption and signaling overhead, and/or provide a good communication performance.

Figure 7:
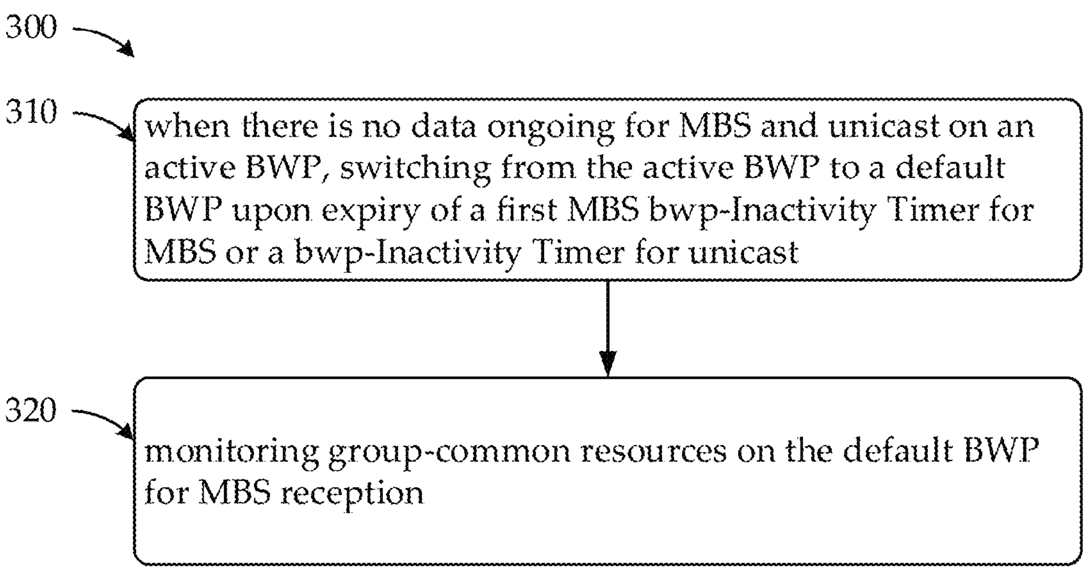
FIG. 7 is a flowchart of a BWP switching method according to a second aspect of the present disclosure.

FIG. 7 illustrates a BWP switching method 300 for multicast and broadcast service (MBS) according to an aspect of the present disclosure. The method 300 is performed by a user equipment (UE) in a network. The method 300 may include the following steps. In Block 310, when there is no data ongoing for MBS and unicast on an active BWP, the UE switches from the active BWP to a default BWP upon expiry of a first MBS bwp-Inactivity Timer for MBS or a bwp-Inactivity Timer for unicast. In Block 320, the UE monitors group-common resources on the default BWP for MBS reception. This can solve issues in the prior art, improve reliability of MBS transmission, minimize BWP switching time, improve resource efficiency, improve power consumption and signaling overhead, and/or provide a good communication performance.

Figure 8:
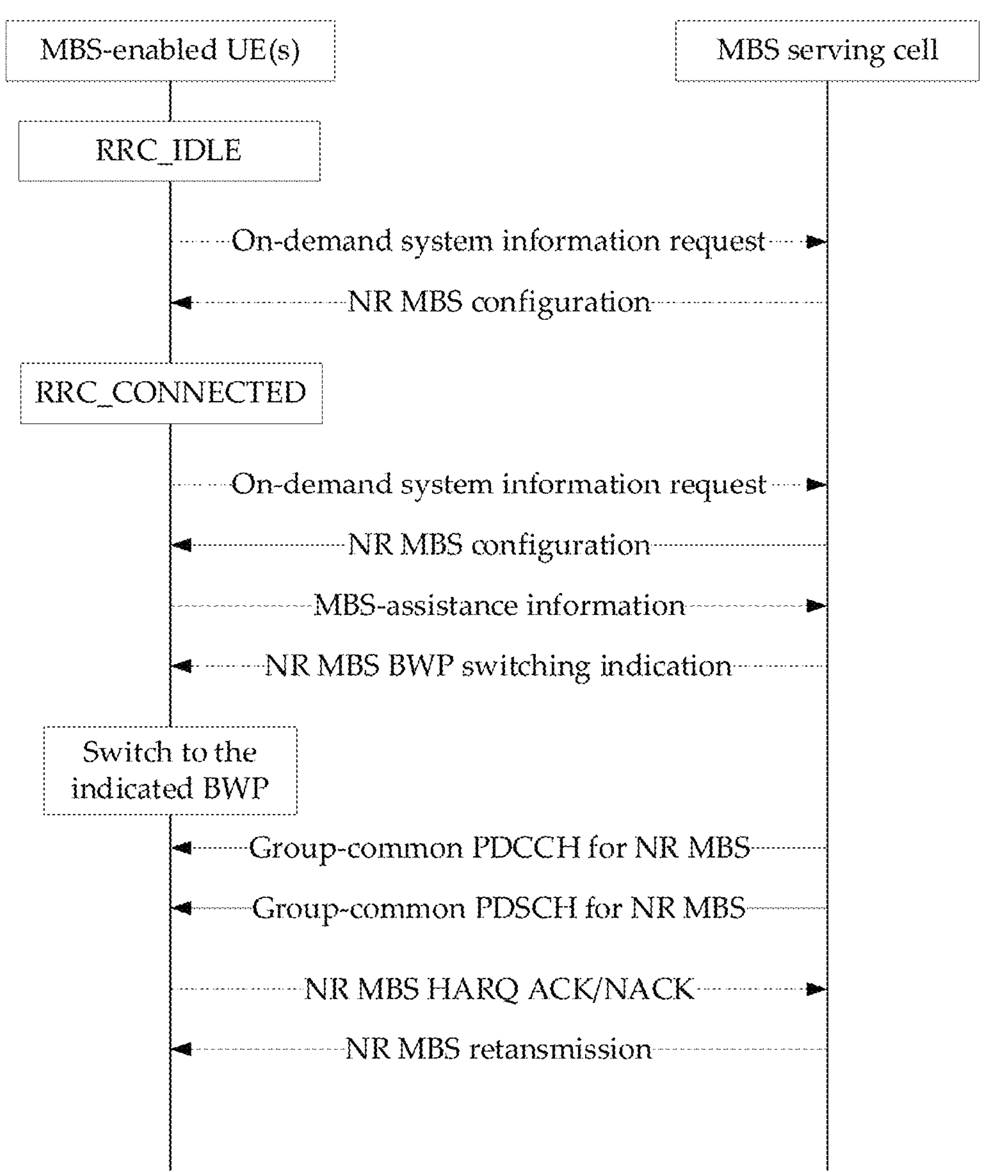
FIG. 8 is a flowchart of MBS BWP switching for an RRC_CONNECTED MBS-enabled UE according to an embodiment of the present disclosure.

A first embodiment of the present disclosure in FIG. 5(*a*) and FIG. 8 shows an RRC_CONNECTED MBS-enabled UE(s) supports NR MBS BWP switching via FDMed manner within the associated unicast BWP.

After power up, an RRC_IDLE UE stays on the initial MBS BWP for receiving NR MBS configuration as described above. At least, NR MBS configuration should be received while the UE is in RRC_CONNECTED. In some cases, NR MBS configuration is received upon the transmission of pre-configured on-demand system information request for NR MBS. In other words, a new system information or RRC configuration message for NR MBS should be defined and transmitted via BCCH and/or MCCH.

Once the UE is interested to receive NR MBS, at least for broadcast service, it transmits MBS-assistance information (e.g., interest/counting signaling/MBS scheduling request) via RRC/PHY layer signaling on UL group-common resource within the associated MBS BWP to MBS serving cell. If the MBS serving cell knows the UE(s) is interested in the associated MBS, it can decide whether the UE(s) should switch to default/active MBS BWP-according to UE capability, unicast/MBS BWP's traffic loading, UE number threshold, etc. and then transmit NR MBS BWP switching indication on DL group-common resource within the associated MBS BWP, if necessary.

Note that there are several options (i.e., on-demand system information request, interest indication, counting signaling, and MBS scheduling request) to represent an RRC_CONNECTED UE is interested in one MBS session. In a first example, when the UE transmits the MBS-assistance information on the associated UL group-common resource, the serving cell can only identify there is UE interested in the associated MBS session. The MBS-assistance information may be at least 1-bit indication of RRC/PHY layer signaling or an orthogonal sequence transmitted on UL group-common resource. In a second example, when the UE transmits the MBS-assistance information on the associated UE dedicated resource, the serving cell can identify the number of UE(s) are interested in the associated MBS session and then make decision whether to switch BWP for the UE(s) or not. In this case, the MBS-assistance information may consist of a list of prioritized frequencies/BWPs on which the UE is interested to receive MBS sessions. On the other hand, in a third example, when the UE transmits the MBS-assistance information via a pre-configured orthogonal sequence on the group-common resource, the serving cell can identify there are UE(s) are interested in the associated MBS session and then make decision whether to switch BWP for the UE(s) or not. For signaling reduction and performance consideration, the transmission of pre-configured on-demand system information request for NR MBS can be represented as a kind of interest indication.

NR MBS BWP switching indication can be indicated by RRC signaling (i.e., RRCReconfiguration) or controlled by group-common PDCCH for MBS BWP switching indication/interest MBS BWP switching indication (i.e., in a new format DCI). Upon the reception of NR MBS BWP switching indication in RRC signaling, the UE(s) switches BWP to the indicated BWP as default/active MBS BWP. Then the UE(s) monitors group-common PDCCH/PDSCH resource for NR MBS data reception. Upon the reception of NR MBS BWP switching indication on DL group-common resource, the UE(s) switches BWP to the indicated BWP as default/active MBS BWP. Then the UE(s) monitors group-common PDSCH resource for NR MBS data reception.

Note that the NR MBS BWP switching can be considered with the status (e.g., whether unicast data is ongoing) of unicast BWP to decide the switching of BWP. The MBS-enabled UE(s) could switch to the indicated BWP upon no data transmission/reception for unicast and MBS on the associated active BWP and then monitor the group-common PDCCH/PDSCH resource of MBS target cell for NR MBS data reception.

As such, the MBS data may be transmitted by delivery mode 1 (i.e., higher reliability/latency MBS requirement) or delivery mode 2 (i.e., lower reliability/latency MBS requirement) via PTM/PTP, depending on MBS QoS requirement. In general, the delivery mode 1 is used for multicast session whereas the delivery mode 2 is used for broadcast session. NR MBS HARQ ACK/NACK feedback is supported for higher reliability MBS requirement. The UE(s) can transmit NR MBS HARQ ACK/NACK feedback on UL group-common resource in associated UL active MBS BWP. Generally, MBS data and MBS retransmission are received on the same DL active MBS BWP for a UE without any BWP switching. However, in some cases, the serving cell may configure different MBS BWPs (not shown) for MBS data and MBS retransmission via MBS HARQ information in a new DCI format on UL group-common resource. The MBS-enabled UE(s) required MBS retransmission may activate more than one BWP at a given time for the reception of MBS data and MBS retransmission based on MBS HARQ BWP switching indication.

In this embodiment, the MBS BWPs may overlap or support FDM within the associated unicast BWP. The NR MBS data can be operated with unicast data simultaneously on UE unicast BWP via FDMed manner. The MBS BWP switching should consider with UE's unicast BWP switching based on the UE's service requirement (e.g., focus on MBS reception and/or unicast reception).

In some cases, with RAN functional split as shown in FIG. 3, the associated gNB-CU/gNB-DU F1AP identifier and parameters during NR MBS may be used. NR MBS BWP switching via FDMed manner within the associated unicast BWP is performed as the aforesaid embodiment, wherein the RRC message proposed in this embodiment is encapsulated in the F1AP message(s) (e.g., UE Context Modification, DL/UL RRC Message Transfer, etc.) and will not be described again.

A second embodiment of the present disclosure in FIG. 5(*b*) and FIG. 8 shows an RRC_CONNECTED MBS-enabled UE(s) supports NR BWP switching via TDMed manner within the associated unicast BWP.

After power up, an RRC_IDLE UE stays on the initial BWP for receiving NR MBS configuration as described above. At least, NR MBS configuration should be received while the UE is in RRC_CONNECTED. In some cases, NR MBS configuration is received upon the transmission of pre-configured on-demand system information request for NR MBS. In other words, a new system information or RRC configuration message for NR MBS should be defined and transmitted via BCCH and/or MCCH.

Once the UE is interested to receive NR MBS, at least for broadcast service, it transmits MBS-assistance information (e.g., interest/counting signaling/MBS scheduling request) via RRC/PHY layer signaling on the MBS specific region within the associated unicast BWP to MBS serving cell. If the MBS serving cell knows the UE(s) is interested in the associated MBS, it can decide whether the UE(s) should switch to default/active unicast BWP-according to UE capability, unicast BWP's traffic loading, UE number threshold, etc. and then transmit NR MBS BWP switching indication on the MBS specific region within the associated unicast BWP, if necessary.

Note that there are several options (i.e., on-demand system information, interest indication, counting signaling, and MBS scheduling request) to represent an RRC_CONNECTED UE is interested in one MBS session. In a first example, when the UE transmits the MBS-assistance information on the MBS specific region, the serving cell can only identify there is UE interested in the associated MBS session. The MBS-assistance information may be at least 1-bit indication of RRC/PHY layer signaling or an orthogonal sequence transmitted with unicast signaling via TDMed manner. In a second example, when the UE transmits the MBS-assistance information on the associated UE dedicated resource, the serving cell can identify the number of UE(s) are interested in the associated MBS session and then make decision whether to switch BWP for the UE(s) or not. In this case, the MBS-assistance information may consist of a list of prioritized frequencies/BWPs on which the UE is interested to receive MBS sessions. On the other hand, in a third example, when the UE transmits the MBS-assistance information via a pre-configured orthogonal sequence on the MBS specific region, the serving cell can identify there are UE(s) are interested in the associated MBS session and then make decision whether to switch BWP for the UE(s) or not. The MBS BWP switching should consider with UE's unicast BWP switching based on the UE's service requirement (e.g., focus on MBS reception and/or unicast reception). For signaling reduction and performance consideration, the transmission of pre-configured on-demand system information request for NR MBS can be represented as a kind of interest indication.

NR MBS BWP switching indication can be indicated by RRC signaling (i.e., RRCReconfiguration) or controlled by the MBS specific control region for MBS BWP switching indication/interest MBS BWP switching indication (i.e., in a new format DCI).

Upon the reception of NR MBS BWP switching indication in RRC signaling, the UE(s) switches BWP to the indicated BWP for unicast and MBS data reception simultaneously. Then the UE(s) monitors the MBS specific control and data region on the indicated BWP for NR MBS data reception. Upon the reception of NR MBS BWP switching indication on the MBS specific region, the UE(s) switches BWP to the indicated BWP for unicast and MBS data reception simultaneously. Then the UE(s) monitors the MBS specific data region on the indicated BWP for NR MBS data reception.

Note that the NR MBS BWP switching can be considered with the status (e.g., whether unicast data is ongoing) of unicast BWP to decide the switching of BWP. The MBS-enabled UE(s) could switch to the indicated BWP upon no data transmission/reception for unicast and MBS on the associated active BWP and then monitor the MBS specific region of MBS target cell for NR MBS data reception.

As such, the MBS data may be transmitted by delivery mode 1 (i.e., higher reliability/latency MBS requirement) or delivery mode 2 (i.e., lower reliability/latency MBS requirement) via PTM/PTP, depending on MBS QOS requirement. In general, the delivery mode 1 is used for multicast session whereas the delivery mode 2 is used for broadcast session. NR MBS HARQ ACK/NACK feedback is supported for higher reliability MBS requirement. The UE(s) can transmit NR MBS HARQ ACK/NACK feedback on the MBS specific region in associated UL active BWP. Generally, MBS data and MBS retransmission are received on the same DL active BWP for a UE without any BWP switching. However, in some cases, the serving cell may configure different BWPs (not shown) for MBS data and MBS retransmission via MBS HARQ information in a new DCI format on the MBS specific control region. The MBS-enabled UE(s)

required MBS retransmission may activate more than one BWP at a given time for the reception of MBS data and MBS retransmission based on MBS HARQ BWP switching indication.

In this embodiment, the NR MBS data can be operated with unicast data simultaneously on UE unicast BWP via TDMed manner.

In some cases, with RAN functional split as shown in FIG. 3, the associated gNB-CU/gNB-DU F1AP identifier and parameters during NR MBS may be used. NR BWP switching via TDMed manner within the associated unicast BWP is performed as the aforesaid embodiment, wherein the RRC message proposed in this embodiment is encapsulated in the F1AP message(s) (e.g., UE Context Modification, DL/UL RRC Message Transfer, etc.) and will not be described again.

A third embodiment of the present disclosure in FIG. 5(*c*) and FIG. 8 shows an RRC_CONNECTED MBS-enabled UE(s) supports NR BWP switching via FDMed/TDMed manner with the associated unicast BWP.

After power up, an RRC_IDLE UE stays on the initial BWP for receiving NR MBS configuration as described above. At least, NR MBS configuration should be received while the UE is in RRC_CONNECTED. In some cases, NR MBS configuration is received upon the transmission of pre-configured on-demand system information request for NR MBS. In other words, a new system information or RRC configuration message for NR MBS should be defined and transmitted via BCCH and/or MCCH.

Once the UE is interested to receive NR MBS, at least for broadcast service, it transmits MBS-assistance information (e.g., interest/counting signaling/MBS scheduling request) via RRC/PHY layer signaling on UL group-common resource within the associated UL BWP to MBS serving cell. If the MBS serving cell knows the UE(s) is interested in the associated MBS, it can decide whether the UE(s) should switch to default/active BWP-according to UE capability, unicast/MBS BWP's traffic loading, UE number threshold, etc. and then transmit NR MBS BWP switching indication on DL group-common resource within the associated DL BWP, if necessary.

Note that there are several options (i.e., on-demand system information, interest indication, counting signaling, and MBS scheduling request) to represent an RRC_CONNECTED UE is interested in one MBS session. In a first example, when the UE transmits the MBS-assistance information on the associated UL group-common resource, the serving cell can only identify there is UE interested in the associated MBS session. The MBS-assistance information may be at least 1-bit indication of RRC/PHY layer signaling or an orthogonal sequence transmitted with unicast signaling via TDMed or FDMed manner depending on the activated BWP UE stays. In a second example, when the UE interests in receiving MBS but stays on the active unicast BWP which is not the MBS specific BWP, it transmits the MBS-assistance information on the associated UE dedicated resource. The serving cell can identify the number of UE(s) are interested in the associated MBS session and then make decision whether to switch BWP for the UE(s) or not. In this case, the MBS-assistance information may consist of a list of prioritized frequencies/BWPs on which the UE is interested to receive MBS sessions. On the other hand, in a third example, when the UE interests in receiving MBS and stays on the active MBS BWP, it transmits the MBS-assistance information on the associated UL group-common resource. The serving cell may identify the number of UE(s) are interested in the associated MBS session and then make decision whether to switch BWP for the UE(s) or not. In this case, the MBS-assistance information may consist of a list of prioritized frequencies/BWPs on which the UE is interested to receive MBS sessions. Furthermore, in a fourth example, when the UE transmits the MBS-assistance information via a pre-configured orthogonal sequence on the group-common resource, the serving cell can identify there are UE(s) are interested in the associated MBS session and then make decision whether to switch BWP for the UE(s) or not. For signaling reduction and performance consideration, the transmission of pre-configured on-demand system information request for NR MBS can be represented as a kind of interest indication.

NR MBS BWP switching indication can be indicated by RRC signaling (i.e., RRCReconfiguration) or controlled by group-common PDCCH for MBS BWP switching indication/interest MBS BWP switching indication (i.e., in a new format DCI). Note that the MBS BWP switching should consider with UE's unicast BWP switching based on the UE's service requirement (e.g., focus on MBS reception and/or unicast reception).

Upon the reception of NR MBS BWP switching indication in RRC signaling, the UE(s) switches BWP to the indicated BWP as default/active MBS BWP. Then the UE(s) monitors the group-common PDCCH/PDSCH resource for NR MBS data reception. Upon the reception of NR MBS BWP switching indication on DL group-common resource, the UE(s) switches BWP to the indicated BWP as default/active MBS BWP. Then the UE(s) monitors the group-common PDSCH resource for NR MBS data reception.

Furthermore, in some cases, the serving cell may configure different active unicast BWP and MBS BWP for the transmission of unicast and MBS data respectively. If there is only one BWP can be activated at a given time for a UE, the downlink control information transmitted on the active unicast BWP indicates NR MBS BWP switching to the specific UE. The specific UE switches to the indicated BWP for MBS data reception. If there are more than one BWP can be activated at a given time for a UE, the group-common PDCCH resource transmitted on the MBS BWP indicates NR MBS BWP switching indication to the MBS-enabled UE(s).

As such, the MBS data may be transmitted by delivery mode 1 (i.e., higher reliability/latency MBS requirement) or delivery mode 2 (i.e., lower reliability/latency MBS requirement) via PTM/PTP, depending on MBS QoS requirement. In general, the delivery mode 1 is used for multicast session whereas the delivery mode 2 is used for broadcast session. NR MBS HARQ ACK/NACK feedback is supported for higher reliability MBS requirement. The UE(s) can transmit NR MBS HARQ ACK/NACK feedback on UL group-common resource in associated UL MBS BWP. Generally, MBS data and MBS retransmission are received on the same DL MBS BWP for a UE without any BWP switching. However, in some cases, the serving cell may further configure different BWPs (not shown) for MBS data and MBS retransmission via MBS HARQ information in a new DCI format on UL group-common resource. The MBS-enabled UE(s) required MBS retransmission may activate more than one BWP at a given time for the reception of MBS data and MBS retransmission based on MBS HARQ BWP switching indication.

In this embodiment, the NR MBS data can be operated with unicast data simultaneously on UE unicast BWP via TDMed/FDMed manner on the associated BWP.

In some cases, with RAN functional split as shown in FIG. 3, the associated gNB-CU/gNB-DU F1AP identifier and parameters during NR MBS may be used. NR BWP switching via FDMed/TDMed manner with the associated unicast BWP is performed as the aforesaid embodiment, wherein the RRC message proposed in this embodiment is encapsulated in the F1AP message(s) (e.g., UE Context Modification, DL/UL RRC Message Transfer, etc.) and will not be described again.

Figure 9:
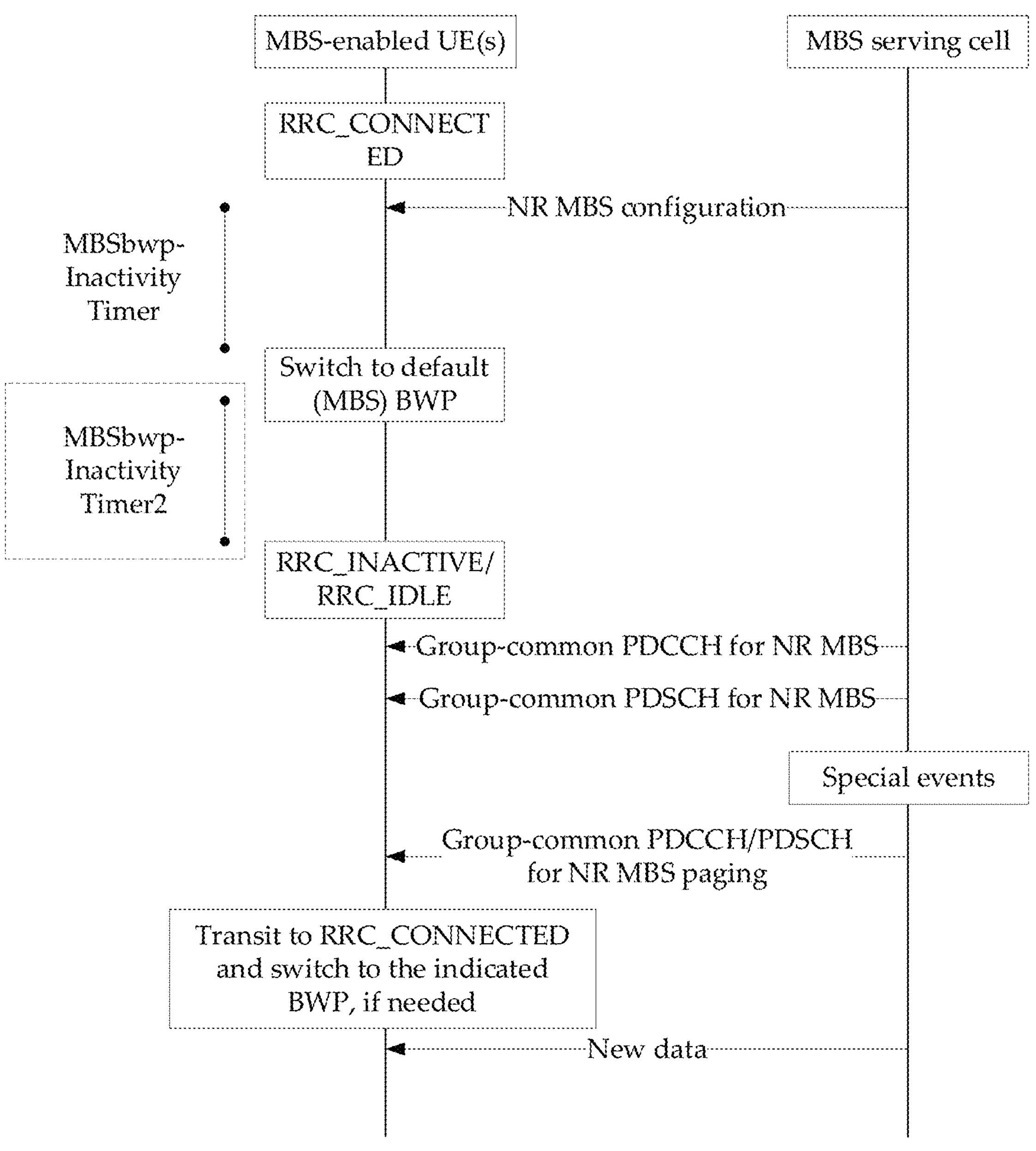
FIG. 9 is a flowchart of MBS BWP switching for an RRC_IDLE/RRC_INACTIVE UE according to an embodiment of the present disclosure.

A fourth embodiment of the present disclosure in FIG. 5(*a*) and FIG. 9 shows an RRC_IDLE/RRC_INACTIVE MBS-enabled UE(s) supports NR MBS BWP switching via FDMed manner within the associated unicast BWP. The MBS configuration is received while the UE is in RRC_CONNECTED. When there is no data ongoing for MBS and unicast, upon the expiry of MBSbwp-Inactivity Timer/bwp-Inactivity Timer, the UE can switch to the default BWP and stay in RRC_CONNECTED or RRC_INACTIVE or RRC_IDLE. If the UE determines to stay in RRC_CONNECTED and there is no data ongoing for MBS and unicast on the default MBS BWP during MBSbwp-Inactivity Timer2, it transits to RRC_INACTIVE or RRC_IDLE upon the expiry of MBSbwp-Inactivity Timer2. The UE(s) monitors the group-common PDCCH/PDSCH resource on the default MBS BWP for NR MBS reception based on the received MBS configuration.

Once the special events occur, the MBS serving cell may transmits the group-common PDCCH scheduled MBS paging that is scrambled by G-RNTI or I-RNTI or P-RNTI. Note that the special events may be one of the following:

Emergency service (e.g., 911 service)

Congestion control of the MBS serving cell (i.e., change of the MBS serving cell)

New data arriving

Upon the reception of MBS paging, the UE(s) transits to RRC_CONNECTED and switches to the indicated BWP based on the received MBS BWP switching indication on the group-common PDCCH resource. If the MBS BWP switching indication is not explicitly indicated in DCI, the UE(s) can receive the new data on the DL default MBS BWP without any MBS BWP switching. If the change of the MBS serving cell occurs, the UE(s) can switch to the new MBS serving cell for new MBS data reception (not show). In this embodiment, the MBSbwp-Inactivity Timer/Timer2 can be considered with bwp-Inactivity Timer to decide the state of UE(s). The RRC_CONNECTED UE(s) could transit to RRC_IDLE/RRC_INACTIVE upon no data transmission/reception for unicast and MBS on the associated active BWP.

In some cases, with RAN functional split as shown in FIG. 3, the associated gNB-CU/gNB-DU F1AP identifier and parameters during NR MBS may be used. NR MBS BWP switching via FDMed manner within the associated unicast BWP is performed as the aforesaid embodiment, wherein the RRC message proposed in this embodiment is encapsulated in the F1AP message(s) (e.g., UE Context Modification, DL/UL RRC Message Transfer, etc.) and will not be described again.

A fifth embodiment of the present disclosure in FIG. 5(*b*) and FIG. 9 shows an RRC_IDLE/RRC_INACTIVE MBS-enabled UE(s) supports NR MBS BWP switching via TDMed manner within the associated unicast BWP. The MBS configuration is received while the UE is in RRC_CONNECTED. When there is no data ongoing for MBS and unicast, upon the expiry of MBSbwp-Inactivity Timer/bwp-Inactivity Timer, the UE can switch to the default BWP and stay in RRC_CONNECTED or RRC_INACTIVE or RRC_IDLE. If the UE determines to stay in RRC_CONNECTED and there is no data ongoing for MBS and unicast on the default BWP during MBSbwp-Inactivity Timer2, it transits to RRC_INACTIVE or RRC_IDLE upon the expiry of MBSbwp-Inactivity Timer2. The UE(s) monitors the MBS specific control/data region on the default BWP for NR MBS reception based on the received MBS configuration.

Once the special events occur, the MBS serving cell may transmits the MBS specific control region scheduled MBS paging is scrambled by G-RNTI or I-RNTI or P-RNTI. Note that the special events may be one of the following:

Emergency service (e.g., 911 service)

Congestion control of the MBS serving cell (i.e., change of the MBS serving cell)

New data arriving

Upon the reception of MBS paging, the UE(s) transits to RRC_CONNECTED and switches to the indicated BWP based on the received MBS BWP switching indication on MBS specific control region. If the MBS BWP switching indication is not explicitly indicated in DCI, the UE(s) can receive the new data on the DL default BWP without any BWP switching. If the change of the MBS serving cell occurs, the UE(s) can switch to the new MBS serving cell for new MBS data reception (not show). In this embodiment, the MBSbwp-Inactivity Timer/Timer2 can be considered with bwp-Inactivity Timer to decide the state of UE(s). The RRC_CONNECTED UE(s) could transit to RRC_IDLE/RRC_INACTIVE upon no data transmission/reception for unicast and MBS on the associated active BWP.

In some cases, with RAN functional split as shown in FIG. 3, the associated gNB-CU/gNB-DU F1AP identifier and parameters during NR MBS may be used. NR MBS BWP switching via TDMed manner within the associated unicast BWP is performed as the aforesaid embodiment, wherein the RRC message proposed in this embodiment is encapsulated in the F1AP message(s) (e.g., UE Context Modification, DL/UL RRC Message Transfer, etc.) and will not be described again.

A sixth embodiment of the present disclosure in FIG. 5(*c*) and FIG. 9 shows an RRC_IDLE/RRC_INACTIVE MBS-enabled UE(s) supports NR MBS BWP switching via FDMed/TDMed manner with the associated unicast BWP. The MBS configuration is received while the UE is in RRC_CONNECTED. The serving cell may configure different active unicast BWP and MBS BWP for the transmission of unicast and MBS data respectively. If there is only one BWP can be activated at a given time for a UE, and when there is no data ongoing for MBS/unicast on the active BWP, upon the expiry of MBSbwp-Inactivity Timer/bwp-Inactivity Timer, the UE can switch to the default BWP and stay in RRC_CONNECTED or RRC_INACTIVE or RRC_IDLE. If the UE determines to stay in RRC_CONNECTED and there is no data ongoing for MBS/unicast on the default BWP during MBSbwp-Inactivity Timer2 or bwp-Inactivity Timer, it transits to RRC_INACTIVE or RRC_IDLE upon the expiry of MBSbwp-Inactivity Timer2 or bwp-Inactivity Timer. The UE(s) monitors the group-common PDCCH/PDSCH resource on the default BWP for NR MBS reception based on the received MBS configuration.

In further embodiments, if there are more than one BWP can be activated at a given time for a UE, the MBSbwp-Inactivity Timer/Timer2 can be considered with bwp-Inactivity Timer to decide the state of UE(s). When there is no data ongoing for MBS and unicast on the associated active MBS and unicast BWP, upon the expiry of MBSbwp-Inactivity Timer and bwp-Inactivity Timer, the UE can switch to the default BWP and stay in RRC_CONNECTED or RRC_INACTIVE or RRC_IDLE. If the UE determines to stay in RRC_CONNECTED and there is no data ongoing for MBS and unicast on the default BWP during MBSbwp-Inactivity Timer2 and bwp-Inactivity Timer, it transits to RRC_INACTIVE or RRC_IDLE upon the expiry of MBSbwp-Inactivity Timer2 and bwp-Inactivity Timer. The UE(s) monitors the group-common PDCCH/PDSCH resource on the default BWP for NR MBS reception based on the received MBS configuration.

Once the special events occur, the MBS serving cell may transmits the group-common PDCCH scheduled MBS paging is scrambled by G-RNTI or I-RNTI or P-RNTI. Note that the special events may be one of the following:

Emergency service (e.g., 911 service)

Congestion control of the MBS serving cell (i.e., change of the MBS serving cell)

New data arriving

Upon the reception of MBS paging, the UE(s) transits to RRC_CONNECTED and switches to the indicated BWP based on the received MBS BWP switching indication on the group-common PDCCH resource. If the MBS BWP switching indication is not explicitly indicated in DCI, the UE(s) can receive the new data on the DL default BWP without any BWP switching. If the change of the MBS serving cell occurs, the UE(s) can switch to the new MBS serving cell for new MBS data reception (not show).

In some cases, with RAN functional split as shown in FIG. 3, the associated gNB-CU/gNB-DU F1AP identifier and parameters during NR MBS may be used. NR MBS BWP switching via FDMed and TDMed manner with the associated unicast BWP is performed as the aforesaid embodiment, wherein the RRC message proposed in this embodiment is encapsulated in the F1AP message(s) (e.g., UE Context Modification, DL/UL RRC Message Transfer, etc.) and will not be described again.

Figure 10:
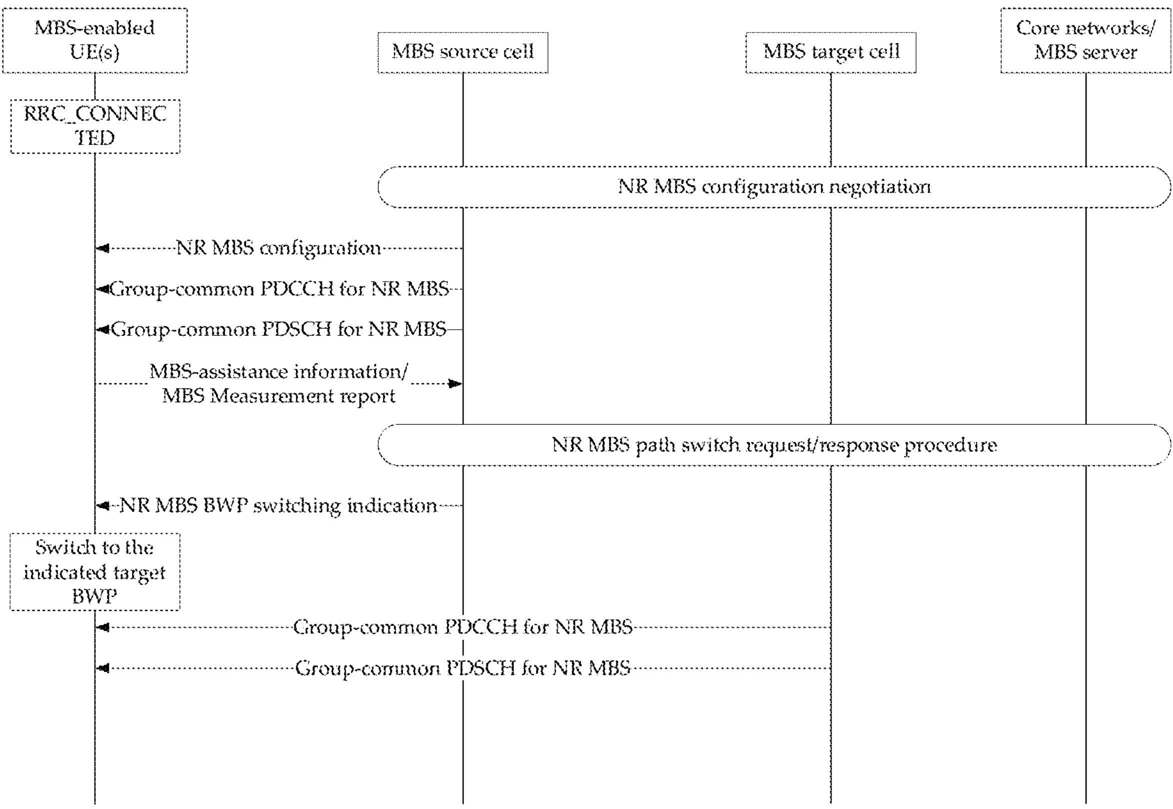
FIG. 10 is a flowchart of MBS BWP switching for an RRC_CONNECTED MBS-enabled UE in an MBS handover scenario according to an embodiment of the present disclosure.

A seventh embodiment of the present disclosure in FIG. 5(*a*) and FIG. 10 shows an RRC_CONNECTED MBS-enabled UE(s) supports NR MBS handover with BWP switching via FDMed manner within the source and target unicast BWPs. NR MBS configuration negotiation between MBS-enabled cells of intra-PLMN/inter-PLMN should be performed firstly. At least the MBS identification of each MBS-enabled cell is shared. The negotiated NR MBS configuration should be received when the MBS-enabled UE is in RRC_CONNECTED. The negotiated NR MBS configuration may include MBS identification (but not limited to) regarding MBS identifier, cell identifier, BWP identifier, G-RNTI of each MBS session/negotiated MBS-enabled cell, MBS transmission frequency and period, BWP configuration of negotiated MBS-enabled cell, etc. Furthermore, the MBS-assistance information would be exchanged between MBS source cell and MBS target cell if it received from the MBS-enabled UE.

In general, the MBS-enabled UE(s) monitors group-common PDCCH/PDSCH resource for NR MBS data reception. Once the UE is leaving the MBS source cell based on some MBS handover criteria (e.g., RSSI) and/or interested MBS frequency prioritization, it transmits MBS-assistance information/MBS Measurement report on the group-common PUCCH/PUSCH resource to the MBS source cell for seamless MBS handover. The MBS source cell may transmit NR MBS path switch request to MBS target cell/core networks. Upon the reception of NR MBS path switch response, the MBS source cell transmits NR MBS BWP switching indication on the group-common resource as stated above.

Note that the NR MBS BWP switching can be considered with the status (e.g., whether unicast data is ongoing) of unicast BWP to decide the switching of BWP. The MBS-enabled UE(s) could switch to the indicated target BWP upon no data transmission/reception for unicast and MBS on the associated active BWP and then monitor the group-common PDCCH/PDSCH resource of MBS target cell for seamless NR MBS data reception.

In further embodiment (not shown), once the MBS source cell is ready to stop for MBS transmission based on cell overloading or some other reasons, the MBS source cell may transmit NR MBS path switch request with an optional cell overloading cause to MBS target cell/core networks. Upon the reception of NR MBS path switch response, the MBS source cell transmits NR MBS BWP switching indication on the group-common resource. The MBS-enabled UE(s) switches to the indicated target BWP and monitors the group-common PDCCH/PDSCH resource of MBS target cell for seamless NR MBS data reception.

In some cases, with RAN functional split as shown in FIG. 3, the associated gNB-CU/gNB-DU F1AP identifier and parameters during NR MBS may be used. NR MBS handover with BWP switching via FDMed manner within the source and target unicast BWPs is performed as the aforesaid embodiment, wherein the RRC message proposed in this embodiment is encapsulated in the F1AP message(s) (e.g., UE Context Modification, DL/UL RRC Message Transfer, etc.) and will not be described again.

An eighth embodiment of the present disclosure in FIG. 5(*b*) and FIG. 10 shows an RRC_CONNECTED MBS-enabled UE(s) supports NR MBS handover with BWP switching via TDMed manner within the source and target unicast BWPs. NR MBS configuration negotiation between MBS-enabled cells of intra-PLMN/inter-PLMN should be performed firstly. At least the MBS identification of each MBS-enabled cell is shared. The negotiated NR MBS configuration should be received when the MBS-enabled UE is in RRC_CONNECTED. The negotiated NR MBS configuration may include MBS identification (but not limited to) regarding MBS identifier, cell identifier, BWP identifier, G-RNTI of each MBS session/negotiated MBS-enabled cell, MBS transmission frequency and period, BWP configuration of negotiated MBS cell, etc. Furthermore, the MBS-assistance information would be exchanged between MBS source cell and MBS target cell if it received from the MBS-enabled UE.

In general, the MBS-enabled UE(s) monitors the MBS specific region for NR MBS data reception. Once the UE is leaving the MBS source cell based on some MBS handover criteria (e.g., RSSI) and/or interested MBS frequency prioritization, it transmits MBS-assistance information/MBS Measurement report on the MBS specific region to the MBS source cell for seamless MBS handover. The MBS source cell may transmit NR MBS path switch request to MBS target cell/core networks. Upon the reception of NR MBS path switch response, the MBS source cell transmits NR MBS BWP switching indication on the MBS specific region as stated above.

Note that the NR MBS BWP switching can be considered with the status (e.g., whether unicast data is ongoing) of unicast BWP to decide the switching of BWP. The MBS-enabled UE(s) could switch to the indicated target BWP upon no data transmission/reception for unicast and MBS on the associated active BWP and then monitor the MBS specific region of MBS target cell for seamless NR MBS data reception.

In further embodiment (not shown), once the MBS source cell is ready to stop for MBS transmission based on cell overloading or some other reasons, the MBS source cell may transmit NR MBS path switch request with an optional cell overloading cause to MBS target cell/core networks. Upon the reception of NR MBS path switch response, the MBS source cell transmits NR MBS BWP switching indication on the MBS specific region. The MBS-enabled UE(s) switches to the indicated target BWP and monitors the MBS specific region of MBS target cell for seamless NR MBS data reception.

In some cases, with RAN functional split as shown in FIG. 3, the associated gNB-CU/gNB-DU F1AP identifier and parameters during NR MBS may be used. NR MBS handover with BWP switching via TDMed manner within the source and target unicast BWPs is performed as the aforesaid embodiment, wherein the RRC message proposed in this embodiment is encapsulated in the F1AP message(s) (e.g., UE Context Modification, DL/UL RRC Message Transfer, etc.) and will not be described again.

A ninth embodiment of the present disclosure in FIG. 5(*c*) and FIG. 10 shows an RRC_CONNECTED MBS-enabled UE(s) supports NR MBS handover with BWP switching via TDMed/FDMed manner with the source and target BWPs. NR MBS configuration negotiation between MBS-enabled cells of intra-PLMN/inter-PLMN should be performed firstly. At least the MBS identification of each MBS-enabled cell is shared. The negotiated NR MBS configuration should be received when the MBS-enabled UE is in RRC_CONNECTED. The negotiated NR MBS configuration may include MBS identification (but not limited to) regarding MBS identifier, cell identifier, BWP identifier, G-RNTI of each MBS session/negotiated MBS-enabled cell, MBS transmission frequency and period, MBS BWP configuration of negotiated MBS-enabled cell, etc. Furthermore, the MBS-assistance information would be exchanged between MBS source cell and MBS target cell if it received from the MBS-enabled UE.

In general, the MBS-enabled UE(s) monitors group-common PDCCH/PDSCH resource for NR MBS data reception. Once the UE is leaving the MBS source cell based on some MBS handover criteria (e.g., RSSI) and/or interested MBS frequency prioritization, it transmits MBS-assistance information/MBS Measurement report on the group-common PUCCH/PUSCH resource to the MBS source cell for seamless MBS handover. The MBS source cell may transmit NR MBS path switch request to MBS target cell/core networks. Upon the reception of NR MBS path switch response, the MBS source cell transmits NR MBS BWP switching indication on the group-common resource as stated above.

Note that the NR MBS BWP switching can be considered with the status (e.g., whether unicast data is ongoing) of unicast BWP to decide the switching of BWP. In other words, the MBS BWP switching should consider with UE's unicast BWP switching based on the UE's service requirement (e.g., focus on MBS reception and/or unicast reception). When the serving cell configures different active unicast BWP and MBS BWP for the transmission of unicast and MBS data respectively, the MBS-enabled UE(s) could switch to the indicated target BWP upon no data transmission/reception for unicast and MBS on the associated active BWP and then monitor the group-common PDCCH/PDSCH resource of MBS target cell for seamless NR MBS data reception.

In further embodiment (not shown), once the MBS source cell is ready to stop for MBS transmission based on cell overloading or some other reasons, the MBS source cell may transmit NR MBS path switch request with an optional cell overloading cause to MBS target cell/core networks. Upon the reception of NR MBS path switch response, the MBS source cell transmits NR MBS BWP switching indication on the group-common resource. The MBS-enabled UE(s) switches to the indicated target BWP and monitors the group-common PDCCH/PDSCH resource of MBS target cell for seamless NR MBS data reception.

In further embodiment (not shown), if there are more than one BWP can be activated at a given time for a UE, the group-common PDCCH resource transmitted on the MBS BWP indicates NR MBS BWP switching indication to the MBS-enabled UE(s). The MBS-enabled UE(s) may switch MBS BWP to the indicated target BWP and keep unicast BWP at source cell (i.e., dual-connectivity with source and target cell). For example, the primary connection may receive unicast data on unicast BWP of source cell, and the secondary connection may receive MBS data on MBS BWP of target cell.

In some cases, with RAN functional split as shown in FIG. 3, the associated gNB-CU/gNB-DU F1AP identifier and parameters during NR MBS may be used. NR MBS handover with BWP switching via TDMed/FDMed manner with the source and target BWPs is performed as the aforesaid embodiment, wherein the RRC message proposed in this embodiment is encapsulated in the F1AP message(s) (e.g., UE Context Modification, DL/UL RRC Message Transfer, etc.) and will not be described again.

Figure 11:
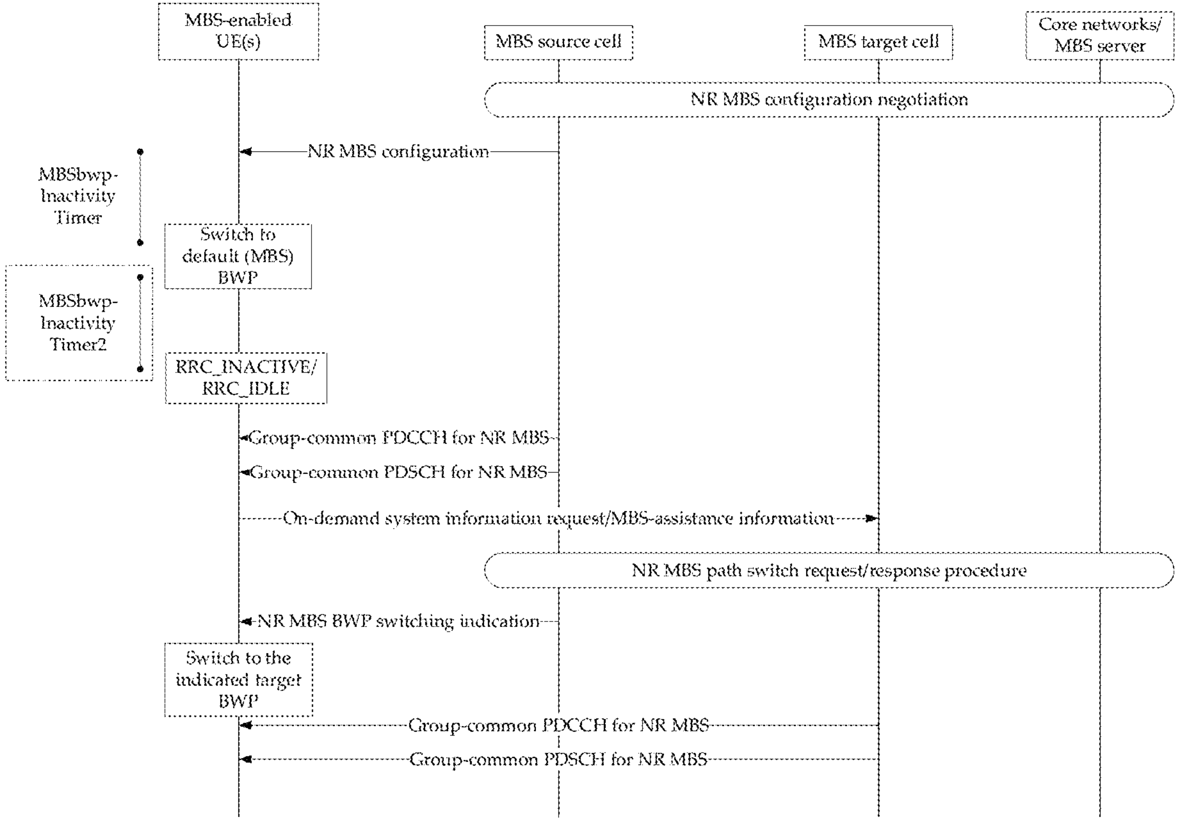
FIG. 11 is a flowchart of MBS BWP switching for an RRC_IDLE/RRC_INACTIVE UE in an MBS cell change scenario according to an embodiment of the present disclosure.

A tenth embodiment of the present disclosure in FIG. 5(*a*) and FIG. 11 shows an RRC_IDLE/RRC_INACTIVE MBS-enabled UE(s) supports the change of MBS cell with BWP switching via FDMed manner within the source and target unicast BWPs. NR MBS configuration negotiation between MBS-enabled cells of intra-PLMN/inter-PLMN should be performed firstly. At least the MBS identification of each MBS-enabled cell is shared. The negotiated NR MBS configuration should be received when the MBS-enabled UE is in RRC_CONNECTED. The negotiated NR MBS configuration may include MBS identification (but not limited to) regarding MBS identifier, cell identifier, BWP identifier, G-RNTI of each MBS session/negotiated MBS-enabled cell, MBS transmission frequency and period, BWP configuration of negotiated MBS-enabled cell, etc. Furthermore, the MBS-assistance information would be exchanged between MBS source cell and MBS target cell if it received from the MBS-enabled UE.

When there is no data ongoing for MBS and unicast, upon the expiry of MBSbwp-Inactivity Timer/bwp-Inactivity Timer, the UE can switch to the default BWP and stay in RRC_CONNECTED or RRC_INACTIVE or RRC_IDLE. If the UE determines to stay in RRC_CONNECTED and there is no data ongoing for MBS and unicast on the default MBS BWP during MBSbwp-Inactivity Timer2, it transits to RRC_INACTIVE or RRC_IDLE upon the expiry of MBSbwp-Inactivity Timer2. The UE(s) monitors the group-common PDCCH/PDSCH resource on the default MBS BWP for NR MBS reception based on the received negotiated NR MBS configuration.

Once the UE is entering the MBS target cell based on some criteria for MBS cell change (e.g., RSSI) and/or interested MBS frequency prioritization, it transmits pre-configured on-demand system information request/MBS-assistance information on the group-common resource to the MBS target cell for seamless MBS cell change. The MBS target cell may transmit NR MBS path switch request to MBS source cell/core networks. Upon the reception of NR MBS path switch command, the MBS source cell transmits NR MBS BWP switching indication on the group-common resource as stated above.

Note that the transmission of pre-configured on-demand system information request for NR MBS can be represented as a kind of interest indication. After MBS network negotiation, NR MBS BWP switching indication can be transmitted from MBS source cell and indicated by RRC signaling (i.e., RRCReconfiguration) or controlled by group-common PDCCH for MBS BWP switching indication/interest MBS BWP switching indication (i.e., in a new format DCI). The MBS-enabled UE(s) could switch to the indicated target BWP and then monitor the group-common PDCCH/PDSCH resource of MBS target cell for seamless MBS cell change.

In further embodiment (not shown), once the MBS source cell is ready to stop for MBS transmission based on cell overloading or some other reasons, the MBS source cell may transmit NR MBS path switch request with an optional cell overloading cause to MBS target cell/core networks. Upon the reception of NR MBS path switch response, the MBS source cell transmits NR MBS BWP switching indication on the group-common resource. The MBS-enabled UE(s) switches to the indicated target BWP and monitors the group-common PDCCH/PDSCH resource of MBS target cell for seamless MBS cell change.

In some cases, with RAN functional split as shown in FIG. 3, the associated gNB-CU/gNB-DU F1AP identifier and parameters during NR MBS may be used. The change of MBS cell with BWP switching via FDMed manner within the source and target unicast BWPs is performed as the aforesaid embodiment, wherein the RRC message proposed in this embodiment is encapsulated in the F1AP message(s) (e.g., UE Context Modification, DL/UL RRC Message Transfer, etc.) and will not be described again.

An eleventh embodiment of the present disclosure in FIG. 5(*b*) and FIG. 11 shows an RRC_IDLE/RRC_INACTIVE MBS-enabled UE(s) supports the change of MBS cell with BWP switching via TDMed manner within the source and target unicast BWPs. NR MBS configuration negotiation between MBS-enabled cells of intra-PLMN/inter-PLMN should be performed firstly. At least the MBS identification of each MBS-enabled cell is shared. The negotiated NR MBS configuration should be received when the MBS-enabled UE is in RRC_CONNECTED. The negotiated NR MBS configuration may include MBS identification (but not limited to) regarding MBS identifier, cell identifier, BWP identifier, G-RNTI of each MBS session/negotiated MBS-enabled cell, MBS transmission frequency and period, BWP configuration of negotiated MBS cell, etc. Furthermore, the MBS-assistance information would be exchanged between MBS source cell and MBS target cell if it received from the MBS-enabled UE.

When there is no data ongoing for MBS and unicast, upon the expiry of MBSbwp-Inactivity Timer/bwp-Inactivity Timer, the UE can switch to the default BWP and stay in RRC_CONNECTED or RRC_INACTIVE or RRC_IDLE. If the UE determines to stay in RRC_CONNECTED and there is no data ongoing for MBS and unicast on the default BWP during MBSbwp-Inactivity Timer2, it transits to RRC_INACTIVE or RRC_IDLE upon the expiry of MBSbwp-Inactivity Timer2. The UE(s) monitors the MBS specific control/data region on the default BWP for NR MBS reception based on the received negotiated NR MBS configuration.

Once the UE is entering the MBS target cell based on some criteria for MBS cell change (e.g., RSSI) and/or interested MBS frequency prioritization, it transmits pre-configured on-demand system information request/MBS-assistance information on the MBS specific region to the MBS target cell for seamless MBS cell change. The MBS target cell may transmit NR MBS path switch request to MBS source cell/core networks. Upon the reception of NR MBS path switch command, the MBS source cell transmits NR MBS BWP switching indication on the MBS specific region as stated above.

Note that the transmission of pre-configured on-demand system information request for NR MBS can be represented as a kind of interest indication. After MBS network negotiation, NR MBS BWP switching indication can be transmitted from MBS source cell and indicated by RRC signaling (i.e., RRCReconfiguration) or controlled by MBS specific control region for MBS BWP switching indication/interest MBS BWP switching indication (i.e., in a new format DCI). The MBS-enabled UE(s) could switch to the indicated target BWP and then monitor the MBS specific region of MBS target cell for seamless MBS cell change.

In further embodiment (not shown), once the MBS source cell is ready to stop for MBS transmission based on cell overloading or some other reasons, the MBS source cell may transmit NR MBS path switch request with an optional cell overloading cause to MBS target cell/core networks. Upon the reception of NR MBS path switch response, the MBS source cell transmits NR MBS BWP switching indication on the MBS specific region. The MBS-enabled UE(s) switches to the indicated target BWP and monitors the MBS specific region of MBS target cell for seamless MBS cell change.

In some cases, with RAN functional split as shown in FIG. 3, the associated gNB-CU/gNB-DU F1AP identifier and parameters during NR MBS may be used. The change of MBS cell with BWP switching via TDMed manner within the source and target unicast BWPs is performed as the aforesaid embodiment, wherein the RRC message proposed in this embodiment is encapsulated in the F1AP message(s) (e.g., UE Context Modification, DL/UL RRC Message Transfer, etc.) and will not be described again.

A twelfth embodiment of the present disclosure in FIG. 5(*c*) and FIG. 11 shows an RRC_IDLE/RRC_INACTIVE MBS-enabled UE(s) supports the change of MBS cell with BWP switching via TDMed/FDMed manner with the source and target BWPs. NR MBS configuration negotiation between MBS-enabled cells of intra-PLMN/inter-PLMN should be performed firstly. At least the MBS identification of each MBS-enabled cell is shared. The negotiated NR MBS configuration should be received when the MBS-enabled UE is in RRC_CONNECTED. The negotiated NR MBS configuration may include MBS identification (but not limited to) regarding MBS identifier, cell identifier, BWP identifier, G-RNTI of each MBS session/negotiated MBS-enabled cell, MBS transmission frequency and period, MBS BWP configuration of negotiated MBS-enabled cell, etc. Furthermore, the MBS-assistance information would be exchanged between MBS source cell and MBS target cell if it received from the MBS-enabled UE.

The serving cell may configure different active unicast BWP and MBS BWP for the transmission of unicast and MBS data respectively. If there is only one BWP can be activated at a given time for a UE, and when there is no data ongoing for MBS/unicast on the active BWP, upon the expiry of MBSbwp-Inactivity Timer/bwp-Inactivity Timer, the UE can switch to the default BWP and stay in RRC_CONNECTED or RRC_INACTIVE or RRC_IDLE. If the UE determines to stay in RRC_CONNECTED and there is no data ongoing for MBS/unicast on the default BWP during MBSbwp-Inactivity Timer2 or bwp-Inactivity Timer, it transits to RRC_INACTIVE or RRC_IDLE upon the expiry of MBSbwp-Inactivity Timer2 or bwp-Inactivity Timer. The UE(s) monitors the group-common PDCCH/PDSCH resource on the default BWP for NR MBS reception based on the received negotiated NR MBS configuration.

In further embodiments, if there are more than one BWP can be activated at a given time for a UE, the MBSbwp-Inactivity Timer/Timer2 can be considered with bwp-Inactivity Timer to decide the state of UE(s). When there is no data ongoing for MBS and unicast on the associated active MBS and unicast BWP, upon the expiry of MBSbwp-Inactivity Timer and bwp-Inactivity Timer, the UE can switch to the default BWP and stay in RRC_CONNECTED or RRC_INACTIVE or RRC_IDLE. If the UE determines to stay in RRC_CONNECTED and there is no data ongoing for MBS and unicast on the default BWP during MBSbwp-Inactivity Timer2 and bwp-Inactivity Timer, it transits to RRC_INACTIVE or RRC_IDLE upon the expiry of MBSbwp-Inactivity Timer2 and bwp-Inactivity Timer. The UE(s) monitors the group-common PDCCH/PDSCH resource on the default BWP for NR MBS reception based on the received negotiated NR MBS configuration.

Once the UE is entering the MBS target cell based on some criteria for MBS cell change (e.g., RSSI) and/or interested MBS frequency prioritization, it transmits pre-configured on-demand system information request/MBS-assistance information on the group-common resource to the MBS target cell for seamless MBS cell change. The MBS target cell may transmit NR MBS path switch request to MBS source cell/core networks. Upon the reception of NR MBS path switch command, the MBS source cell transmits NR MBS BWP switching indication on the group-common resource as stated above.

Note that the transmission of pre-configured on-demand system information request for NR MBS can be represented as a kind of interest indication. After MBS network negotiation, NR MBS BWP switching indication can be transmitted from MBS source cell and indicated by RRC signaling (i.e., RRCReconfiguration) or controlled by group-common PDCCH for MBS BWP switching indication/interest MBS BWP switching indication (i.e., in a new format DCI). When the serving cell configures different active unicast BWP and MBS BWP for the transmission of unicast and MBS data respectively, the MBS-enabled UE(s) could switch to the indicated target BWP and then monitor the group-common PDCCH/PDSCH resource of MBS target cell for seamless MBS cell change.

In further embodiment (not shown), once the MBS source cell is ready to stop for MBS transmission based on cell overloading or some other reasons, the MBS source cell may transmit NR MBS path switch request with an optional cell overloading cause to MBS target cell/core networks. Upon the reception of NR MBS path switch response, the MBS source cell transmits NR MBS BWP switching indication on the group-common resource. The MBS-enabled UE(s) switches to the indicated target BWP and monitors the group-common PDCCH/PDSCH resource of MBS target cell for seamless MBS cell change.

In some cases, with RAN functional split as shown in FIG. 3, the associated gNB-CU/gNB-DU F1AP identifier and parameters during NR MBS may be used. The change of MBS cell with BWP switching via TDMed/FDMed manner with the source and target BWPs is performed as the aforesaid embodiment, wherein the RRC message proposed in this embodiment is encapsulated in the F1AP message(s) (e.g., UE Context Modification, DL/UL RRC Message Transfer, etc.) and will not be described again.

Commercial interests for some embodiments are as follows. 1. Solving issues in the prior art. 2. improving reliability of MBS transmission. 3. minimizing BWP switching time. 4. improving resource efficiency. 5. improving power consumption and signaling overhead. 6. providing a good communication performance. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of “techniques/processes” that can be adopted in 3GPP specification to create an end product. Some embodiments of the present disclosure could be adopted in the 5G NR unlicensed band communications. Some embodiments of the present disclosure propose technical mechanisms.

The embodiment of the present application further provides a computer readable storage medium for storing a computer program. The computer readable storage medium enables a computer to execute corresponding processes implemented by the UE/BS in each of the methods of the embodiment of the present disclosure. For brevity, details will not be described herein again.

The embodiment of the present application further provides a computer program product including computer program instructions. The computer program product enables a computer to execute corresponding processes implemented by the UE/BS in each of the methods of the embodiment of the present disclosure. For brevity, details will not be described herein again.

The embodiment of the present application further provides a computer program. The computer program enables a computer to execute corresponding processes implemented by the UE/BS in each of the methods of the embodiment of the present disclosure. For brevity, details will not be described herein again.

Although not shown in detail any of the devices or apparatus that form part of the network may include at least a processor, a storage unit and a communications interface, wherein the processor unit, storage unit, and communications interface are configured to perform the method of any aspect of the present invention. Further options and choices are described below.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor including the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may include at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

While the present application has been described in connection with what is considered the most practical and preferred embodiments, it is understood that the present application is not limited to the disclosed embodiments but is intended to cover various arrangements made without departing from the scope of the broadest interpretation of the appended claims.

The invention claimed is:

1. A bandwidth part (BWP) switching method for multicast and broadcast service (MBS), performed by a user equipment (UE) in a network, the method comprising:
- when there is no data ongoing for MBS and unicast on an active BWP, switching from the active BWP to a default BWP upon expiry of a first MBS bwp-Inactivity Timer for MBS or a bwp-Inactivity Timer for unicast;
- monitoring group-common resources on the default BWP for MBS reception;
- transiting to RRC_INACTIVE or RRC_IDLE upon the default BWP; and
- transiting to RRC_CONNECTED upon reception of MBS paging once special events occur, wherein the special events comprise one of the following:
- emergency service;
- change of an MBS serving cell; or
- new data arriving.

2. The method of claim 1, wherein the one or more group-common resources are in an MBS specific region with a number of contiguous physical resource blocks (PRBs) on associated unicast BWP.

3. The method of claim 1, further comprising:
- staying in RRC_CONNECTED during a second MBS bwp-Inactivity Timer.

4. The method of claim 1, further comprising:
- receiving the MBS paging from the network via at least one of Radio Access Network (RAN) paging triggered by RAN Notification area or Core Network (CN) paging triggered by Paging Group area.

5. The method of claim 4, wherein the MBS paging is received on group-common Physical Downlink Control Channel (PDCCH) resource from the MBS serving cell, and the group-common PDCCH scheduled MBS paging is scrambled by G-RNTI or I-RNTI or P-RNTI.

6. The method of claim 1, further comprising:
- switching to an indicated BWP based on received MBS BWP switching indication on group-common PDCCH resource;
- receiving new data on group-common PDSCH resource without any MBS BWP switching if the MBS BWP switching indication is not explicitly indicated in the group-common PDCCH resource.

7. The method of claim 1, further comprising:
- transmitting pre-configured on-demand system information request or MBS-assistance information on the group-common resource to an MBS target cell for seamless MBS cell change;
- receiving MBS BWP switching indication from an MBS source cell after MBS network negotiation; and
- switching to an indicated target BWP by the MBS BWP switching indication and monitoring group-common PDCCH/PDSCH resource of the MBS target cell for seamless MBS cell change.

8. The method of claim 1, wherein upon reception of a MBS BWP switching indication from an MBS source cell, switching to an indicated target BWP for an MBS target cell and monitoring group-common PDCCH/PDSCH resource of the MBS target cell for seamless MBS cell change.

9. The method of claim 1, wherein MBS using point-to-multipoint (PTM)/point-to-point (PTP) transmission mode is delivered by multicast radio bearer (MRB)/data radio bearer (DRB) for given UE(s) as well group-common PDCCH scheduled PTM/PTP PDSCH data is scrambled by G-RNTI or I-RNTI or P-RNTI.

10. The method of claim 1, further comprising:
- receiving a notification signaling used to announce an update of MBS configuration,
- wherein there is at least one bit to indicate Multicast Control Channel (MCCH) change due to MBS session start or stop, or a neighboring MBS cell list update.

11. The method of claim 1 further comprising:
- receiving at least one of MBS related system information, MBS configuration or MBS paging, without any MBS BWP switching.

12. A bandwidth part (BWP) switching method for multicast and broadcast service (MBS), performed by a base station (BS) in a network, the method comprising:
- configuring a user equipment (UE) with a first MBS bwp-Inactivity Timer for MBS or a bwp-Inactivity Timer for unicast for the UE to switch, when there is no data ongoing for MBS and unicast on an active BWP, from the active BWP to a default BWP upon expiry of the first MBS bwp-Inactivity Timer or the bwp-Inactivity Timer for unicast;
- expecting the UE to monitor group-common resources on the default BWP for MBS reception;
- configuring the UE for the UE to transit to RRC_INACTIVE or RRC_IDLE upon the default BWP; and
- transmitting MBS paging to the UE once special events occur, to make the UE transit to RRC_CONNECTED upon reception of the MBS paging, wherein the special events comprise one of the following:
- emergency service;
- change of an MBS serving cell; or
- new data provided to the UE.

13. The method of claim 12, wherein the one or more group-common resources are in an MBS specific region with a number of contiguous physical resource blocks (PRBs) on associated unicast BWP.

14. The method of claim 12, further comprising:
- transmitting the MBS paging to the UE from the network via at least one of Radio Access Network (RAN) paging triggered by RAN Notification area or Core Network (CN) paging triggered by Paging Group area.

15. The method of claim 14, wherein the MBS paging is transmitted on group-common Physical Downlink Control Channel (PDCCH) resource by the base station which is the MBS serving cell, and the group-common PDCCH scheduled MBS paging is scrambled by G-RNTI or I-RNTI or P-RNTI.

16. The method of claim 12, further comprising:
- transmitting new data on group-common PDSCH resource for the UE without any MBS BWP switching if an MBS BWP switching indication is not explicitly indicated in group-common PDCCH resource.

17. A user equipment (UE), comprising a memory, a transceiver and a processor coupled to the memory and the transceiver, the processor configured to call and run program instructions stored in a memory, to execute the method of claim 1.

18. A base station (BS), comprising a memory, a transceiver and a processor coupled to the memory and the transceiver, the processor configured to call and run program instructions stored in a memory, to execute the method of claim 12.

* * * * *